(12) United States Patent
Douglass et al.

(10) Patent No.: US 11,175,224 B2
(45) Date of Patent: Nov. 16, 2021

(54) OPTICAL REFRACTION BAROMETER

(71) Applicant: Government of the United States of America, as represented by the Secretary of Commerce, Gaithersburg, MD (US)

(72) Inventors: Kevin O'Connell Douglass, Ellicott City, MD (US); Stephen Paul Eckel, Gaithersburg, MD (US); Jacob Edmond Ricker, Gaithersburg, MD (US); Jay Howard Hendricks, Clarksburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 16/938,300

(22) Filed: Jul. 24, 2020

(65) Prior Publication Data
US 2020/0355606 A1 Nov. 12, 2020

Related U.S. Application Data

(63) Continuation-in-part of application No. 16/520,672, filed on Jul. 24, 2019, now Pat. No. 10,816,325, and
(Continued)

(51) Int. Cl.
*G01N 21/41* (2006.01)
*G01B 9/02* (2006.01)

(52) U.S. Cl.
CPC ......... *G01N 21/41* (2013.01); *G01B 9/02011* (2013.01); *G01N 2021/4106* (2013.01); *G01N 2021/4153* (2013.01)

(58) Field of Classification Search
CPC ............... G01B 9/02011; G01N 21/41; G01N 2021/4106; G01N 2021/4153; G01L 11/02
See application file for complete search history.

(56) References Cited

U.S. PATENT DOCUMENTS

| 4,070,683 A | 1/1978 | Altschuler et al. |
| 5,528,040 A | 6/1996 | Lehmann |

(Continued)

FOREIGN PATENT DOCUMENTS

RU 2089848 C1 9/1997

OTHER PUBLICATIONS

Thorpe, J.I., et al., "Laser frequency stabilization and control through offset sideband locking to optical cavities", Optics Express, 2008, p. 15980-15990, vol. 16 No. 20.
(Continued)

*Primary Examiner* — Michael A Lyons
(74) *Attorney, Agent, or Firm* — Office of Chief Counsel for National Institute of Standards and Technology

(57) ABSTRACT

An optical refraction barometer measures pressure based on refractivity changes and includes: an optical light source; an optical frequency controller; a first optical phase controller; a first polarization controller; an electronic reference arm in optical communication with the first polarization controller; a second optical phase controller in optical communication with the optical frequency controller; a second polarization controller in optical communication with the second optical phase controller; an electronic sample arm in optical communication with the second polarization controller and in electrical communication with the second optical phase controller; a second sideband frequency generator; a mixer in electrical communication with the detector and the second sideband frequency generator; and a first sideband frequency
(Continued)

generator in electrical communication with the mixer; and a dual fixed length optical cavity refractometer.

18 Claims, 7 Drawing Sheets

Related U.S. Application Data a continuation-in-part of application No. 16/520,668, filed on Jul. 24, 2019, now Pat. No. 10,935,370, and a continuation-in-part of application No. 16/520,687, filed on Jul. 24, 2019, now Pat. No. 10,942,089.

(60) Provisional application No. 62/877,926, filed on Jul. 24, 2019, provisional application No. 62/714,953, filed on Aug. 6, 2018.

(56) References Cited

U.S. PATENT DOCUMENTS

| | | | |
|---|---|---|---|
| 5,917,180 A | 6/1999 | Reimer et al. | |
| 6,330,064 B1* | 12/2001 | Rieder | G01N 21/45 356/481 |
| 6,493,091 B2 | 12/2002 | Kourogi et al. | |
| 6,864,477 B2 | 3/2005 | Stuetzler | |
| 7,355,723 B2 | 4/2008 | Carr | |
| 7,440,112 B2 | 10/2008 | Kurokawa et al. | |
| 8,605,289 B2 | 12/2013 | Koerner et al. | |
| 9,719,878 B2 | 8/2017 | Hendricks et al. | |
| 10,041,782 B2 | 8/2018 | Chen | |
| 10,067,050 B2 | 9/2018 | Fleisher et al. | |
| 10,514,299 B2 | 12/2019 | Koulikov | |
| 10,816,325 B2* | 10/2020 | Ahmed | G01B 9/02008 |
| 10,935,370 B2* | 3/2021 | Ahmed | G01B 11/16 |
| 10,942,089 B2* | 3/2021 | Douglass | G01B 11/14 |
| 10,948,282 B2* | 3/2021 | Egan | G01B 9/02007 |
| 2018/0313974 A1 | 11/2018 | Barfoot et al. | |
| 2019/0271643 A1* | 9/2019 | Schwarz Goncalves Henriques | G01N 21/1717 |
| 2020/0041256 A1 | 2/2020 | Ahmed et al. | |
| 2020/0041257 A1 | 2/2020 | Egan et al. | |
| 2020/0041379 A1 | 2/2020 | Douglass et al. | |

OTHER PUBLICATIONS

Bowden, W., et al., "A pyramid MOT with integrated optical cavities as a cold atom platform for an optical lattice clock". Scientific Reports, 2019, p. 11704.

Livas, J.C., et al., "Frequency-tunable pre-stabilized lasers for LISA via sideband locking", Classical and Quantum Gravity, 2009, 094016, vol. 26.

Milani, G., et al., "Multiple wavelength stabilization on a single optical cavity using the offset sideband locking technique", Optics Letters, 2017, p. 1970-1973, vol. 42 No. 10.

Beterov, I.I., et al., "Simple digital system for tuning and long-term frequency stabilization of a CW Ti:Sapphire laser", Optical Engineering, 2015, p. 034111, vol. 54 No. 3.

Fang, J., et al., "Realization of a compact one-seed laser system for atom interferometer-based gravimeters", Optics Express, 2018, p. 1586-1596, vol. 26 No. 2.

Scherschligt, J., et al., "Review Article: Quantum-based vacuum metrology at the National Institute of Standards and Technology", Journal of Vacuum Science and Technology, 2018, 040801, vol. 36.

Stone, J., et al., "Refractometry Using a Helium Standard", 2004, revised 2017, NIST publications.

Stone, J., et al., "Pictometers to Pascals: how precise length measurements enable new photonic pressure standards", JVC Slovenia, 16th Joint Vacuum Conference (JVC-16)/ 14th European Vacuum conference (EVC-14), Jun. 6-10, 2016.

Egan, P., et al., "Cell-based refractometer for pascal realization", Optics Letters, 2017, p. 2944-2947, vol. 42 No. 15.

Kamenev, O.T., et al., "Use of a FiberOptic Mach-Zehnder Interferometer for Creating a Deformometer with Extended Gage Length", Technical Physics Letters, 2014, p. 119-122, vol. 40 No. 2.

* cited by examiner

OPTICAL REFRACTION BAROMETER

CROSS REFERENCE TO RELATED APPLICATIONS

This application is a continuation-in-part of U.S. patent application Ser. No. 16/520,668, filed Jul. 24, 2019, which claims priority to U.S. Provisional Patent Application No. 62/714,953, filed Aug. 6, 2018; U.S. patent application Ser. No. 16/520,672, filed Jul. 24, 2019, which claims priority to U.S. Provisional Patent Application No. 62/714,953, filed Aug. 6, 2018; and U.S. patent application Ser. No. 16/520,687, filed Jul. 24, 2019, which claims priority to U.S. Provisional Patent Application No. 62/714,953, filed Aug. 6, 2018, the disclosures of each of which are incorporated herein by reference in its entirety. This application also claims priority to U.S. Provisional Patent Application No. 62/877,926, filed Jul. 24, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573: email tpo@nist.gov; reference NIST Docket Number 19-048CIP1.

BRIEF DESCRIPTION

Disclosed is an optical refraction barometer for measuring pressure based on refractivity changes between a fixed length optical reference cavity and a fixed length optical sample cavity of a dual fixed length optical cavity refractometer, the optical refraction barometer comprising: an optical light source that produces laser light; an optical frequency controller in optical communication with the optical light source and that: receives the laser light from the optical light source; receives an optical feedback signal from an electronic reference arm; and produces primary light from the laser light based on the optical feedback signal; a first optical phase controller in optical communication with the optical frequency controller and that: receives the primary light from the optical frequency controller; receives a reference phase control signal; and produces an input reference light from the primary light based on the reference phase control signal; a first polarization controller in optical communication with the first optical phase controller and that: receives the input reference light from the first optical phase controller; communicates the input reference light to a dual fixed length optical cavity refractometer; receives a output reference light from the dual fixed length optical cavity refractometer; and communicates the output reference light to an electronic reference arm; the electronic reference arm in optical communication with the first polarization controller and that: receives the output reference light from the first polarization controller; produces the reference phase control signal from the output reference light and communicates the reference phase control signal to the first optical phase controller; produces the optical feedback signal and communicates the optical feedback signal to the optical frequency controller and optionally communicates the optical feedback signal to the optical light source; a second optical phase controller in optical communication with the optical frequency controller and that: receives the primary light from the optical frequency controller; receives a sample phase control signal from an electronic sample arm; and produces an input sample light from the primary light based on the sample phase control signal; a second polarization controller in optical communication with the second optical phase controller and that: receives the input sample light from the second optical phase controller; communicates the input sample light to the dual fixed length optical cavity refractometer; receives a output reference light from the dual fixed length optical cavity refractometer; and communicates the output reference light to the electronic sample arm; the electronic sample arm in optical communication with the second polarization controller and in electrical communication with the second optical phase controller, the electronic sample arm comprising: a detector that receives the output reference light from the second polarization controller and produces a reference cavity signal from the output reference light; a second sideband frequency generator that produces a second sideband frequency; a mixer in electrical communication with the detector and the second sideband frequency generator and that produces an error signal that comprises the reference cavity signal and the second sideband frequency; and a first sideband frequency generator in electrical communication with the mixer and that receives the error signal from the mixer and produces a first sideband frequency from the error signal from which the sample phase control signal is produced by the electronic sample arm for communication to the second optical phase controller; and the dual fixed length optical cavity refractometer comprising: the fixed length optical reference cavity in optical communication with the first polarization controller and that: receives the input reference light from the first polarization controller; propagates the input reference light through fixed length optical reference cavity; and produces the output reference light by reflecting input reference light from a mirror disposed at a terminus of the fixed length optical reference cavity disposed optically distal to the first polarization controller; and the fixed length optical sample cavity in optical communication with the second polarization controller and that: receives the input sample light from the second polarization controller; propagates the input sample light through the fixed length optical sample cavity; and produces the output reference light by reflecting the input sample light from a second mirror disposed at a terminus of the fixed length optical sample cavity disposed optically distal to the second polarization controller.

Disclosed is a process for measuring pressure based on refractivity changes between the fixed length optical reference cavity and the fixed length optical sample cavity of the dual fixed length optical cavity refractometer, the process comprising: producing laser light by the optical light source; receiving, by the optical frequency controller, the laser light from the optical light source; receiving, by the optical frequency controller, the optical feedback signal from the electronic reference arm; producing, by the optical frequency controller, the primary light from the laser light based on the optical feedback signal; receiving, by the first optical phase controller, the primary light from the optical frequency controller; receiving, by the first optical phase controller, the reference phase control signal; producing, by the first optical phase controller, the input reference light from the primary light based on the reference phase control signal; receiving, by the first polarization controller, the input reference light from the first optical phase controller; communicating, by the first polarization controller, the input reference light to the dual fixed length optical cavity refractometer; receiving, by the first polarization controller, the output reference light from the dual fixed length optical cavity refractometer; communicating, by the first polarization controller, the output reference light to the electronic reference arm; receiving, by the electronic reference arm, the output reference light from the first polarization controller; producing, by the electronic reference arm, the reference phase control signal from the output reference light; communicating, by the electronic reference arm, the reference phase control signal to the first optical phase controller; producing, by the electronic reference arm, the optical feedback signal; communicating, by the electronic reference arm, the optical feedback signal to the optical frequency controller; optionally communicating the optical feedback signal to the optical light source from the electronic reference arm; receiving, by the second optical phase controller, the primary light from the optical frequency controller; receiving, by the second optical phase controller, the sample phase control signal from the electronic sample arm; producing, by the second optical phase controller, the input sample light from the primary light based on the sample phase control signal; receiving, by the second polarization controller, the input sample light from the second optical phase controller; communicating, by the second polarization controller, the input sample light to the dual fixed length optical cavity refractometer; receiving, by the second polarization controller, an output reference light from the dual fixed length optical cavity refractometer; communicating, by the second polarization controller, the output reference light to the electronic sample arm; receiving, by the detector of the electronic sample arm, the output reference light from the second polarization controller and producing the reference cavity signal from the output reference light; producing, by the second sideband frequency generator of the electronic sample arm, the second sideband frequency; producing, by the mixer of the electronic sample arm, the error signal; receiving, by the first sideband frequency generator of the electronic sample arm, the error signal and producing the first sideband frequency 246 from the error signal; producing, by the electronic sample arm, the sample phase control signal from the first sideband frequency 246; communicating the sample phase control signal to the second optical phase controller from the electronic sample arm; receiving, by the fixed length optical reference cavity, the input reference light from the first polarization controller; propagating the input reference light through fixed length optical reference cavity; producing, by the fixed length optical reference cavity, the output reference light by reflecting the input reference light from the mirror disposed at the terminus of the fixed length optical reference cavity; receiving, by the fixed length optical sample cavity, the input sample light from the second polarization controller; propagating the input sample light through the fixed length optical sample cavity; and producing, by the fixed length optical sample cavity, the output reference light by reflecting the input sample light from the second mirror disposed at the terminus of the fixed length optical sample cavity.

BRIEF DESCRIPTION OF THE DRAWINGS

The following description should not be considered limiting in any way. With reference to the accompanying drawings, like elements are numbered alike.

DETAILED DESCRIPTION

Figure 1:
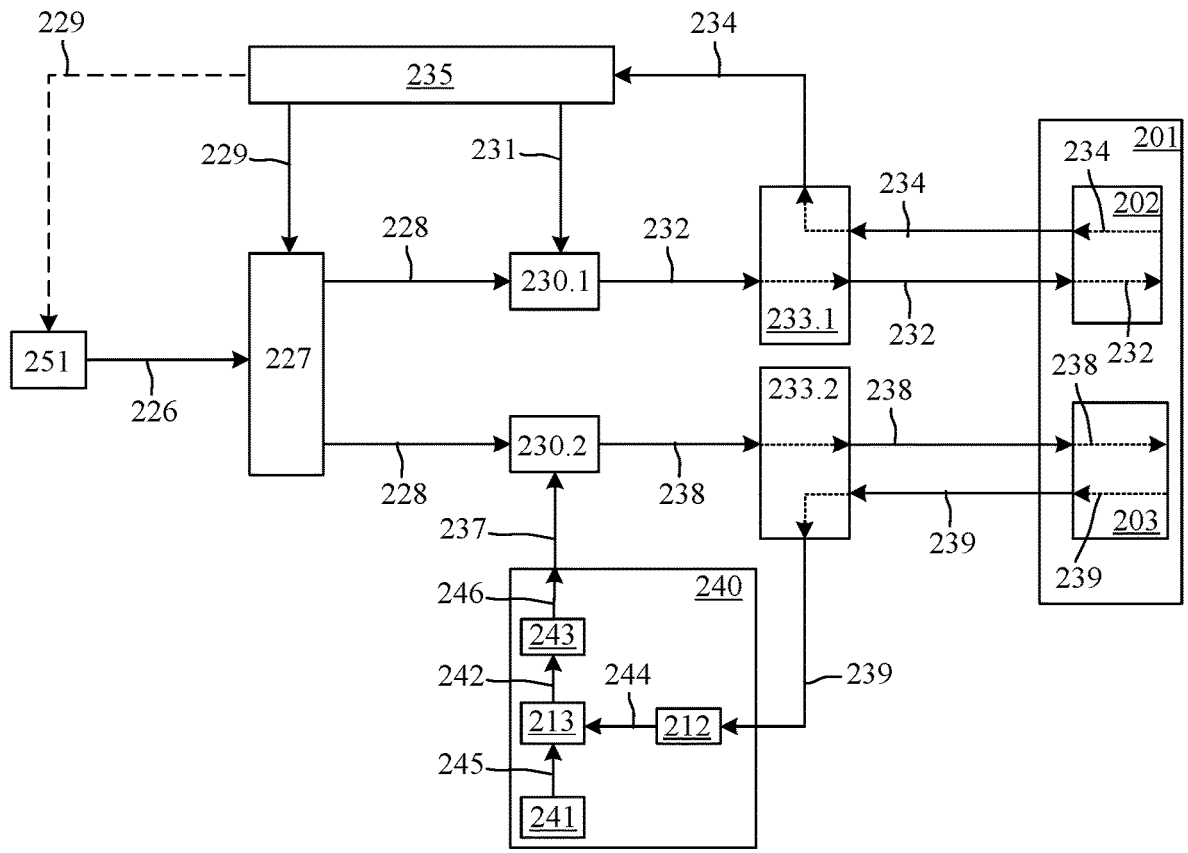
FIG. 1 shows an optical refraction barometer.

A detailed description of one or more embodiments is presented herein by way of exemplification and not limitation.

It has been discovered that an optical refraction barometer described herein measures refractivity-based pressure changes using dual Fabry-Perot cavities with a single laser and off-set sideband locking to one of the cavities. The optical refraction barometer provides refractivity-based pressure measurements performed to very high precision in an absence of being tied to a mercury manometer. As a result, the optical refraction barometer moves away from traceability to the International System of Units (SI, abbreviated from the French Système international (d'unités)) via mechanical measurements of pressure, wherein conventional traceability to the SI involves a manometer based on fluid density, local gravity, and column height or piston gauge force per unit area. Advantageously, the optical refraction barometer achieves traceability to the SI through quantum mechanical aspects of photons interacting with a gas. Quantum chemical determinate of the refractive index of helium provides traceability to the SI sot that the optical refraction barometer can be a quantum-based pressure standard with a dual fixed length optical cavity refractometer that receives light from a single laser producing light that can have a telecom wavelength. Beneficially, inclusion of the single laser lowers cost compared to conventional devices.

In an embodiment, the optical refraction barometer includes offset sideband locking to the dual fixed length optical cavity refractometer, wherein the laser light from the single laser is split, and a portion of the laser light power is used to stabilize the laser to a fixed length optical reference cavity and another portion of the laser light power is coupled to a broad bandwidth electro-optic modulator (EOM) that is separately locked to a fixed length optical sample cavity of the dual fixed length optical cavity refractometer. The EOM in optical communication with the fixed length optical sample cavity can be driven by an RF source at a frequency, e.g., on the order of a gigahertz and a second frequency used for an error signal such as a Pound-Drever-Hall (PDH) lock. Dual-side band and electronic side-band production are provided by the optical refraction barometer.

With the optical refraction barometer, a high-speed photodiode measuring the beat frequency between the reference cavity and sample cavity is not used since the optical refraction barometer directly determines the difference in frequency with a counter. That is, instead of determining pressure in the sample cavity from the beat note or frequency difference between the reference cavity and the sample cavity, the optical refraction barometer directly measures the frequency difference by the tuning frequency input to the EOM. It is contemplated that a high-performance microwave synthesizer can be used to tune the EOM, or a direct-digital-synthesis (DDS) device with fast analog control can be used to tune the EOM. A low bandwidth correction signal maintains lock to the sample cavity because the laser is pre-stabilized to the reference cavity. An error signal from the sample cavity is digitized, and a low bandwidth proportional-integral-derivative (PID) servo directly feedbacks to the microwave synthesizer.

Optical refraction barometer 200 measures pressure based on refractivity changes between fixed length optical reference cavity 202 and fixed length optical sample cavity 203 of dual fixed length optical cavity refractometer 201. In an embodiment, with reference to FIG. 1, FIG. 2, FIG. 3, FIG. 4, and FIG. 5, optical refraction barometer 200 includes: optical refraction barometer 200 for measuring pressure based on refractivity changes between fixed length optical reference cavity 202 and fixed length optical sample cavity 203 of dual fixed length optical cavity refractometer 201, optical refraction barometer 200 including: optical light source 251 that produces laser light 226; optical frequency controller 227 in optical communication with optical light source 251 and that: receives laser light 226 from optical light source 251; receives optical feedback signal 229 from electronic reference arm 235; and produces primary light 228 from laser light 226 based on optical feedback signal 229; first optical phase controller 230.1 in optical communication with optical frequency controller 227 and that: receives primary light 228 from optical frequency controller 227; receives reference phase control signal 231; and produces input reference light 232 from primary light 228 based on reference phase control signal 231; first polarization controller 233.1 in optical communication with first optical phase controller 230.1 and that: receives input reference light 232 from first optical phase controller 230.1; communicates input reference light 232 to dual fixed length optical cavity refractometer 201; receives output reference light 234 from dual fixed length optical cavity refractometer 201; and communicates output reference light 234 to electronic reference arm 235; electronic reference arm 235 in optical communication with first polarization controller 233.1 and that: receives output reference light 234 from first polarization controller 233.1; produces reference phase control signal 231 from output reference light 234 and communicates reference phase control signal 231 to first optical phase controller 230.1; produces optical feedback signal 229 and communicates optical feedback signal 229 to optical frequency controller 227 and optionally communicates optical feedback signal 229 to optical light source 251; second optical phase controller 230.2 in optical communication with optical frequency controller 227 and that: receives primary light 228 from optical frequency controller 227; receives sample phase control signal 237 from electronic sample arm 240; and produces input sample light 238 from primary light 228 based on sample phase control signal 237; second polarization controller 233.2 in optical communication with second optical phase controller 230.2 and that: receives input sample light 238 from second optical phase controller 230.2; communicates input sample light 238 to dual fixed length optical cavity refractometer 201; receives output reference light 239 from dual fixed length optical cavity refractometer 201; and communicates output reference light 239 to electronic sample arm 240; electronic sample arm 240 in optical communication with second polarization controller 233.2 and in electrical communication with second optical phase controller 230.2, electronic sample arm 240 including: detector 212 that receives output reference light 239 from second polarization controller 233.2 and produces reference cavity signal 244 from output reference light 239; second sideband frequency generator 241 that produces second sideband frequency 245; mixer 213 in electrical communication with detector 212 and second sideband frequency generator 241 and that produces error signal 242 that includes reference cavity signal 244 and second sideband frequency 245; and first sideband frequency generator 243 in electrical communication with mixer 213 and that receives error signal 242 from mixer 213 and produces first sideband frequency 246 from error signal 242 from which sample phase control signal 237 is produced by electronic sample arm 240 for communication to second optical phase controller 230.2; and dual fixed length optical cavity refractometer 201 including: fixed length optical reference cavity 202 in optical communication with first polarization controller 233.1 and that: receives input reference light 232 from first polarization controller 233.1; propagates input reference light 232 through fixed length optical reference cavity 202; and produces output reference light 234 by reflecting input reference light 232 from a mirror disposed at a terminus of fixed length optical reference cavity 202 disposed optically distal to first polarization controller 233.1; and fixed length optical sample cavity 203 in optical communication with second polarization controller 233.2 and that: receives input sample light 238 from second polarization controller 233.2; propagates input sample light 238 through fixed length optical sample cavity 203; and produces output reference light 239 by reflecting input sample light 238 from a second mirror disposed at a terminus of fixed length optical sample cavity 203 disposed optically distal to second polarization controller 233.2.

In an embodiment, optical light source 251 includes laser 210 that produces laser light 226; and Faraday isolator 207 in optical communication with laser 210 and that communicates laser light 226 to optical frequency controller 227.

In an embodiment, optical frequency controller 227 includes voltage controlled oscillator 204 in electrical communication with electronic reference arm 235 and that receives optical feedback signal 229 from electronic reference arm 235 and that produces reference modulation frequency 252 from optical feedback signal 229; acousto-optic modulator 208 in electrical communication with voltage controlled oscillator 204 and in optical communication with optical light source 251 and that: receives reference modulation frequency 252 from voltage controlled oscillator 204 and laser light 226 from optical light source 251; and produces primary light 228 from modulation of laser light 226 at a modulation frequency controlled by reference modulation frequency 252.

In an embodiment, optical frequency controller 227 further includes wavelength detector 214 in optical communication with acousto-optic modulator 208 and that receives primary light 228 from acousto-optic modulator 208 and produces optical frequency counter signal 253 from primary light 228.

In an embodiment, first optical phase controller 230.1 includes electro-optic modulator 209 in optical communication with optical frequency controller 227 and in electrical communication with electronic reference arm 235 and that:

receives primary light 228 from optical frequency controller 227; receives reference phase control signal 231 from electronic reference arm 235; and produces input reference light 232 from modulating primary light 228 at a modulation frequency controlled by reference phase control signal 231.

In an embodiment, second optical phase controller 230.2 includes electro-optic modulator 209 in optical communication with optical frequency controller 227 and in electrical communication with electronic sample arm 240 and that: receives primary light 228 from optical frequency controller 227; receives sample phase control signal 237 from electronic sample arm 240; and produces input sample light 238 from modulating primary light 228 at a modulation frequency controlled by sample phase control signal 237.

In an embodiment, first polarization controller 233.1 includes: polarizing beam splitter 215 in optical communication with first optical phase controller 230.1 and in electrical communication with electronic reference arm 235 and that: receives input reference light 232 from first optical phase controller 230.1; communicates input reference light 232 to waveplate 216; receives output reference light 234 from waveplate 216; and communicates output reference light 234 to electronic reference arm 235; and waveplate 216 in optical communication with polarizing beam splitter 215 and dual fixed length optical cavity refractometer 201 and that: receives input reference light 232 from polarizing beam splitter 215; receives output reference light 234 from fixed length optical reference cavity 202; and communicates output reference light 234 to polarizing beam splitter 215.

In an embodiment, second polarization controller 233.2 includes: polarizing beam splitter 215 in optical communication with second optical phase controller 230.2 and in electrical communication with electronic sample arm 240 and that: receives input sample light 238 from second optical phase controller 230.2; communicates input sample light 238 to waveplate 216; receives output reference light 239 from waveplate 216; and communicates output reference light 239 to electronic sample arm 240; and waveplate 216 in optical communication with polarizing beam splitter 215 and dual fixed length optical cavity refractometer 201 and that: receives input sample light 238 from polarizing beam splitter 215; receives output reference light 239 from fixed length optical sample cavity 203; and communicates output reference light 239 to polarizing beam splitter 215.

In an embodiment, electronic sample arm 240 includes: detector 212 in optical communication with second polarization controller 233.2 and that: receives output reference light 239 from second polarization controller 233.2; and produces reference cavity signal 244 from output reference light 239; second sideband frequency generator 241 that produces second sideband frequency 245; mixer 213 in electrical communication with detector 212 and second sideband frequency generator 241 and that: receives reference cavity signal 244 from detector 212; receives second sideband frequency 245 from second sideband frequency generator 241; and produces error signal 242 that includes reference cavity signal 244 and second sideband frequency 245; PID servo 205 in electrical communication with mixer 213 and that receives error signal 242 and produces servo control signal 263 from error signal 242; first sideband frequency generator 243 in electrical communication with PID servo 205 and that receives servo control signal 263 and produces first sideband frequency 246 from servo control signal 263; and power combiner 222 in electrical communication with first sideband frequency generator 243 and second sideband frequency generator 241 and that: receives first sideband frequency 246 from first sideband frequency generator 243 and second sideband frequency 245 from second sideband frequency generator 241; produces sample phase control signal 237 from first sideband frequency 246 and second sideband frequency 245; and communicates sample phase control signal 237 to second optical phase controller 230.2.

In an embodiment, electronic sample arm 240 includes: detector 212 in optical communication with second polarization controller 233.2 and that: receives output reference light 239 from second polarization controller 233.2; and produces reference cavity signal 244 from output reference light 239; second sideband frequency generator 241 that produces second sideband frequency 245; mixer 213 in electrical communication with detector 212 and second sideband frequency generator 241 and that: receives reference cavity signal 244 from detector 212; receives second sideband frequency 245 from second sideband frequency generator 241; and produces error signal 242 that includes reference cavity signal 244 and second sideband frequency 245; PID servo 205 in electrical communication with mixer 213 and that receives error signal 242 and produces servo control signal 263 from error signal 242; first sideband frequency generator 243 in electrical communication with PID servo 205 and second sideband frequency generator 241 and that: receives servo control signal 263 from PID servo 205; receives second sideband frequency 245 from second sideband frequency generator 241; and produces first sideband frequency 246 from servo control signal 263 and second sideband frequency 245; and directional coupler 211 in electrical communication with first sideband frequency generator 243 and that: receives first sideband frequency 246 from first sideband frequency generator 243; produces sample phase control signal 237 from first sideband frequency 246; and communicates sample phase control signal 237 to second optical phase controller 230.2.

In an embodiment, electronic reference arm 235 includes: detector 212 in optical communication with first polarization controller 233.1 and that receives output reference light 234 from first polarization controller 233.1; and produces reference cavity signal 244 from output reference light 234; radio frequency source 224 that produces reference phase control signal 231; mixer 213 in electrical communication with detector 212 and radio frequency source 224 and that: receives reference cavity signal 244 from detector 212; receives reference phase control signal 231 from radio frequency source 224; and produces mixed reference signal 236 that includes reference cavity signal 244 and reference phase control signal 231; and PIID servo 206 in electrical communication with mixer 213 and that receives mixed reference signal 236 and produces optical feedback signal 229 that is communicated to optical frequency controller 227 and optionally to optical light source 251.

In an embodiment, electronic reference arm 235 includes: detector 212 in optical communication with first polarization controller 233.1 and that receives output reference light 234 from first polarization controller 233.1; and produces reference cavity signal 244 from output reference light 234; radio frequency source 224 that produces first reference phase control signal 231.1; mixer 213 in electrical communication with detector 212 and radio frequency source 224 and that: receives reference cavity signal 244 from detector 212; receives first reference phase control signal 231.1 from radio frequency source 224; and produces mixed reference signal 236 that includes reference cavity signal 244 and first reference phase control signal 231.1; PIID servo 206 in electrical communication with mixer 213 and that receives mixed reference signal 236 and produces optical feedback signal 229 that is communicated to optical frequency controller 227 and optionally to optical light source 251; sideband frequency source 225 in electrical communication with radio frequency source 224 and PIID servo 206 and that: receives first reference phase control signal 231.1 from radio frequency source 224; receives optical feedback signal 229 from PIID servo 206; and produces second reference phase control signal 231.2 from optical feedback signal 229 and first reference phase control signal 231.1; directional coupler 211 in electrical communication with sideband frequency source 225 and that: receives second reference phase control signal 231.2 from sideband frequency source 225; produces reference phase control signal 231 from second reference phase control signal 231.2; and communicate reference phase control signal 231 to first optical phase controller 230.1.

Components of optical refraction barometer 200 can be made from and include various materials. It should be appreciated that refraction of gases in dual cavities (202, 203) of dual fixed length optical cavity refractometer 201 interact with light so that pressure of sample gas 332 is determined. In an embodiment, with reference to FIG. 5, dual fixed length optical cavity refractometer 201 includes fixed length optical reference cavity 202 that includes refractometer body 259; first mirror 218.1 disposed at entry end 257 of refractometer body 259; and first optical cavity optic 256.1 disposed at exit end 258 of refractometer body 259. First mirror 218.1 is in optical communication and optically opposes first optical cavity optic 256.1. Fixed length optical reference cavity 202 receives reference gas 334 at first pressure P1, receives input reference light 232, produces output reference light 234 from reflection of a portion of input reference light 232 by first optical cavity optic 256.1 and that is communicated through reference gas 334 in fixed length optical reference cavity 202 to exit fixed length optical reference cavity 202 at entry end 257 as output reference light 234, and produces reference transmitted light 249 from communication of a portion of input reference light 232 through first optical cavity optic 256.1 after interaction with reference gas 334. Fixed length optical sample cavity 203 includes second mirror 218.2 disposed at entry end 257 of refractometer body 259; and second optical cavity optic 256.2 disposed at exit end 258 of refractometer body 259. Second mirror 218.2 is in optical communication and optically opposes second optical cavity optic 256.2. Fixed length optical sample cavity 203 receives sample gas 332 at second pressure P2, receives input sample light 238 at second mirror 218.2, communicates input sample light 238 through sample gas 332 from mirror 218.2 to optical cavity optic 256.2, produces output sample light 239 from reflection of a portion of input sample light 238 by optical cavity optic 256.2 and that is communicated through sample gas 332 in fixed length optical sample cavity 203 to exit fixed length optical reference cavity 202 via mirror 218.2 as output sample light 239, and produces sample transmitted light 250 from communication of a portion of input sample light 238 through optical cavity optic 256.2 after interaction with sample gas 332. Gas source 330 is in fluid communication with fixed length optical sample cavity 203 and provides sample gas 332 to fixed length optical sample cavity 203. Second pump 314.2 is in fluid communication with fixed length optical sample cavity 203 to pump sample gas 332 from fixed length optical sample cavity 203. First pump 314.1 is in fluid communication with fixed length optical reference cavity 202 to obtain a selected pressure thereof at first pressure P1 via pump stem 350 connected to fixed length optical reference cavity 202, wherein wall 322 of pump stem 350 bounds flow channel 324 through which reference gas 334 flows to pump 314.1. Valves 328 throttle and isolate gas source 330 and pump 314, and gas flows through gas line 326.

In optical refraction barometer 200, laser 210 produces laser light 226. Laser 210 can produce laser light that is resonant or nearly resonant with or and can include a HeNe laser, Ti:Sapphire laser, external-cavity diode laser, and the like. Exemplary laser 210 includes an infrared external cavity diode laser. Moreover, a laser linewidth can be smaller than the free spectral range of cavity (202 or 203) defined by cavity optic (218, 256). In an embodiment, laser 210 includes a HeNe laser and an infrared external cavity diode laser.

Laser light 226 can include a single-frequency laser light to probe resonances of cavity (202 or 203). Exemplary laser light 226 includes light from a HeNe laser. A wavelength of laser light 226 can be from UV to IR, specifically from 250 nm to 2 um, and more specifically can be a wavelength defined by cavity optic (218 or 256). Moreover, a frequency spectrum of laser light 226 can have a single frequency peak. A power of laser light 226 can be from 1 uW to 1 W, specifically from 10 uW to 100 mW, and more specifically from 100 uW to 10 mW. When in optical communication with cavity (202 or 203), the wavelength can correspond to a transmitted wavelength of cavity (202 or 203) and a linewidth smaller than that of cavity (202 of 203) defined by cavity optics (218, 256). In an embodiment, laser light 226 have a wavelength of 1542 nm, 10 mW power, 2 kHz linewidth, and similar properties.

In dual fixed length optical cavity refractometer 201, Faraday isolator 207 can include an optic that prevents the transmission of laser light 226 in one direction but not the other, wherein Faraday isolator 207 selectively propagates laser light 226 from laser 210 and isolates back reflection of laser light 226 from optical frequency controller 227 to laser 210. Exemplary optical isolators are Faraday effect isolators.

In some embodiments, laser 210 receives optical feedback signal 229.2, wherein optical feedback signal 229.2 controls a wavelength of laser 210. An analogue voltage signal of optical feedback signal 229.2 can be from −100 volts to 100 volts, specifically from 10 volts to 10 volt sand more specifically from −1 volt to 1 volt. Further, optical feedback signal 229.2 includes an analogue voltage signal that is output from the PIID servo, in this case it is only the I or integral component that slowly tunes the laser wavelength using piezoelectric methods or thermal.

In optical refraction barometer 200, radio frequency oscillator 204 provides a radio frequency that is rapidly tunable for driving acousto-optic modulator 208. Radio frequency oscillator 204 receives a feedback signal and outputs a radio frequency for driving acoustic optical modulator 208. Radio frequency oscillator 204 can include a voltage controlled oscillator, direct digital synthesizer, function generator, radio frequency synthesizer, and the like. Exemplary radio frequency source 204 includes a voltage controlled oscillator (VCO) that is in resonance with a fiber acoustic optic modulator AOM, free space AOM, and the like. VCO can have a peak operating frequency and a tuning range that is a fraction of the peak operating frequency. Optical feedback signal 229 can be from −100 volts to 100 volts, specifically from 10 volts to 10 volts, and more specifically from 0 volts to 17 volts. Further, optical feedback signal 229 is the resulting output from the PIID servo controller. In an embodiment, includes high bandwidth PIID servo controller.

Radio frequency oscillator 204 receives optical feedback signal 229, wherein optical feedback signal 229 controls output of a frequency of radio frequency oscillator 204. A radio frequency oscillator with output at a given peak frequency near the resonance of the AOM+/−20% of AOM bandwidth. The radio frequency oscillator has an output from 1 MHz to 3 GHZ, and more specifically 50 MHz+/−20 MHz.

Acousto-optic modulator 208 receives laser light 226 from laser 210, a control signal from radio frequency oscillator 204 that controls a modulation frequency of acousto-optic modulator 208, and produces primary light 228 that is modulated at the modulation frequency. The modulation frequency can be from 50 MHz to 5 GHz, specifically from 50 MHz to 1 GHz, and more specifically from 40 MHz to 60 MHz. Primary light 228 has a wavelength that can be from 600 nm to 3000 nm, specifically from 1000 nm to 1600 nm, and more specifically from 1540 nm to 1545 nm and can have an optically modulation frequency provided by that of acousto-optic modulator 208. Other properties of primary light 228 are provided by laser light 226.

It is contemplated that laser light 226 and primary light 228 as well as other laser light used in optical refraction barometer 200 can propagate through free space or fiber optic cable. For Fiber optic propagation of laser light, optical splitter 255 receives primary light 228 from acousto-optic modulator 208, wherein optical splitter 255 is a condensed-matter medium that splits light. Exemplary fiber optics include single-mode fiber optical cable, polarization-maintaining single-mode fiber optical cable, and the like.

Wavelength detector 214 receives primary light 228 from optical splitter 255, detects the wavelength or power of primary light 228, and outputs optical frequency counter signal 253 from primary light 228 that indicates the wavelength of primary light 228.

Electro-optic modulator 209 can include a fiber-based electrooptic crystal driven by reference phase control signal 231 or sample phase control signal 237 to phase modulate laser light traveling through optical fiber. Phase modulation depths generated by electro-optic modulator 209 can be from 0.01 to 0.1. Electro-optic modulation of primary light 228 by electro-optic modulator 209 in optical phase controller 230.1 produces input reference light 232, and electro-optic modulation of primary light 228 in optical phase controller 230.2 produces input sample light 238. Input reference light 232 and input sample light 238 independently have a wavelength that can be from 600 nm to 3000 nm, specifically from 1000 nm to 1600 nm, and more specifically from 1540 nm to 1545 nm provided by electro-optic modulator 209. Other properties of input reference light 232 and input sample light 238 are respectively provided by primary light 228.

In optical refraction barometer 200, fiber port 217 can include an optic that couples light from air to a condensed matter medium such as fiber optic cable. The efficiency of the coupling can be from 0.1 to 1, specifically from 0.5 to 1.0. Exemplary fiber ports 217 include fiber-to-free space couplers. It is contemplated that light upstream of fiber port 217 propagates in fiber optic cable while light downstream of fiber port 217 propagates in free space.

Mirror 218 can include a concave, convex, or flat mirror to reflect and direct light. Exemplary mirror 218 includes a planar dielectric mirror that is anti-reflective coated on the input and highly reflective on the inside. The reflectivity of mirror 218 can be from 0.1 to 1.0, specifically from 0.9 to 1.0, and more specifically from 0.999 to 1.0 at a wavelength from the ultraviolet (UV) to infrared (IR).

Polarizing beam splitter 215 can include an optic that splits the incoming beam power according to its polarization state, with orthogonal linear polarizations traveling orthogonally to each other. In this manner, polarizing beam splitter 215, can communicate light to dual fixed length optical cavity refractometer 201 and receive reflected light from dual fixed length optical cavity refractometer 201 for communication, e.g., to electronic reference arm 235 or electronic sample arm 240. Exemplary polarizing beam splitter are polarizing beam splitting cubes and Glan-Laser calcite polarizers.

Waveplate 216 can include an optic to manipulate a polarization of light (e.g., 232, 238, 234, 239) propagating through waveplate 216. Exemplary waveplates and polarizers include birefringent crystals and calcite polarizers.

Detector 212 can transduce the power of light (e.g., 234, 239) into reference cavity signal 244. A bandwidth of detector 212 can be from 0 Hz and 10 GHz, specifically from 0 and the frequency of the free spectral range define by cavity (202 or 203). Exemplary detector 212 includes a power meter, photodiode, photoreceiver, and the like. Cavity signal 260 can include an electrical signal, e.g., voltage or current, that provides the frequency, power, or intensity, of light received by detector 212.

Radio frequency source 224 produces reference phase control signal 231 that is an oscillating electrical signal for electro-optic modulator 209 and mixer 213. The frequency and power of reference phase control signal 231 are in a range of operation of electro-optic modulator 209.

Mixer 213 receives multiple electrical inputs (e.g., 231, 244, 245), combines the inputs, and produces an electrical output (e.g., 236, 242) that includes both of the electrical signals in a combined electrical waveform. Amplifier 221 Receives such electrical signals and amplifies an amplitude of the signal. Further, bandpass filter 220 filters frequency electrical signals to eliminate frequency components outside a selected range. The filter bandwidth can be 30% or less than the modulation frequency from 5 MHz to 12 MHz, more specifically from 3 MHz and 6 MHz.

PIID servo 206 provides low-noise servo control of laser 210 and radio frequency oscillator 204. PIID servo 206 can include integral feedback and locking to cavities (202, 203), e.g., with atomic or molecular transitions. Further, loop-filter parameters provide servo-loop optimization and can detect when the servo loop filter has gone out of lock and with recapture of lock, wherein PIID servo 206 can monitor optical feedback signal 229 for detecting unlocking that produces a disengagement of electro-optic modulator 209 with return of optical feedback signal 229 to the last known valid value until electro-optic modulator 209 re-engages the lock.

In some embodiments, sideband, frequency source 225 receives reference phase control signal 231.1 from radio frequency source 224 to produce reference phase control signal 231.2 that is communicated to directional coupler 211 for communication as reference phase control signal 231 to electro-optic modulator 209 of optical phase controller 230.1 and also to frequency counter 223 that produces reference arm counter signal 254 from reference phase control signal 231. In this manner, an embodiment configured as shown in FIG. 4 can be different than embodiments configured according to FIG. 2 and FIG. 3, wherein an alternate method of measuring the laser wavelength is eliminated. The exact wavelength is known and uses radio frequency tuning of modulation frequencies to lock the two arms (reference and sample) of dual fixed length optical cavity refractometer 201. Frequency tuning is measured directly, eliminating measurement of a beat note signal between a source of unknown wavelength against a source of known wavelength.

PID servo 205 receives an electric signal such as error signal 242 and provides output servo control signal 263 that can control a frequency of first sideband frequency 246 output by first sideband frequency generator 243. Here, the frequency of first sideband frequency generator 243 can be from 1 MHz to 150 GHz, specifically from 50 MHz to 50 GHz, and more specifically from 500 MHz to 10 GHz, and first sideband frequency generator 243 can be, e.g., a voltage controlled oscillator, microwave synthesizer, direct digital synthesizer, arbitrary waveform generator, and the like.

Directional coupler 211 directs a portion of the electromagnetic power in first sideband frequency 246 to amplifier 221 and a portion of first sideband frequency 246 to frequency counter 223. Further, directional coupler 211 directs the power so that the power flows in one direction. Frequency counter 223 receives first sideband frequency 246 and produces offset frequency 247 for first sideband frequency 246.

Power combiner 222 combines first sideband frequency 246 with first sideband frequency 246 from second sideband frequency generator 241 to produce sample phase control signal 237 that is communicated to electro-optic modulator 209 of optical phase controller 230.2. Exemplary second sideband frequency generator 241 includes function generator, direct digital synthesizer, radio frequency source, wherein second sideband frequency 245 can have a frequency from 1 MHz to 100 MHz, specifically from 5 MHz to 50 MHz, and more specifically from 9 MHz to 15 MHz.

Figure 2:
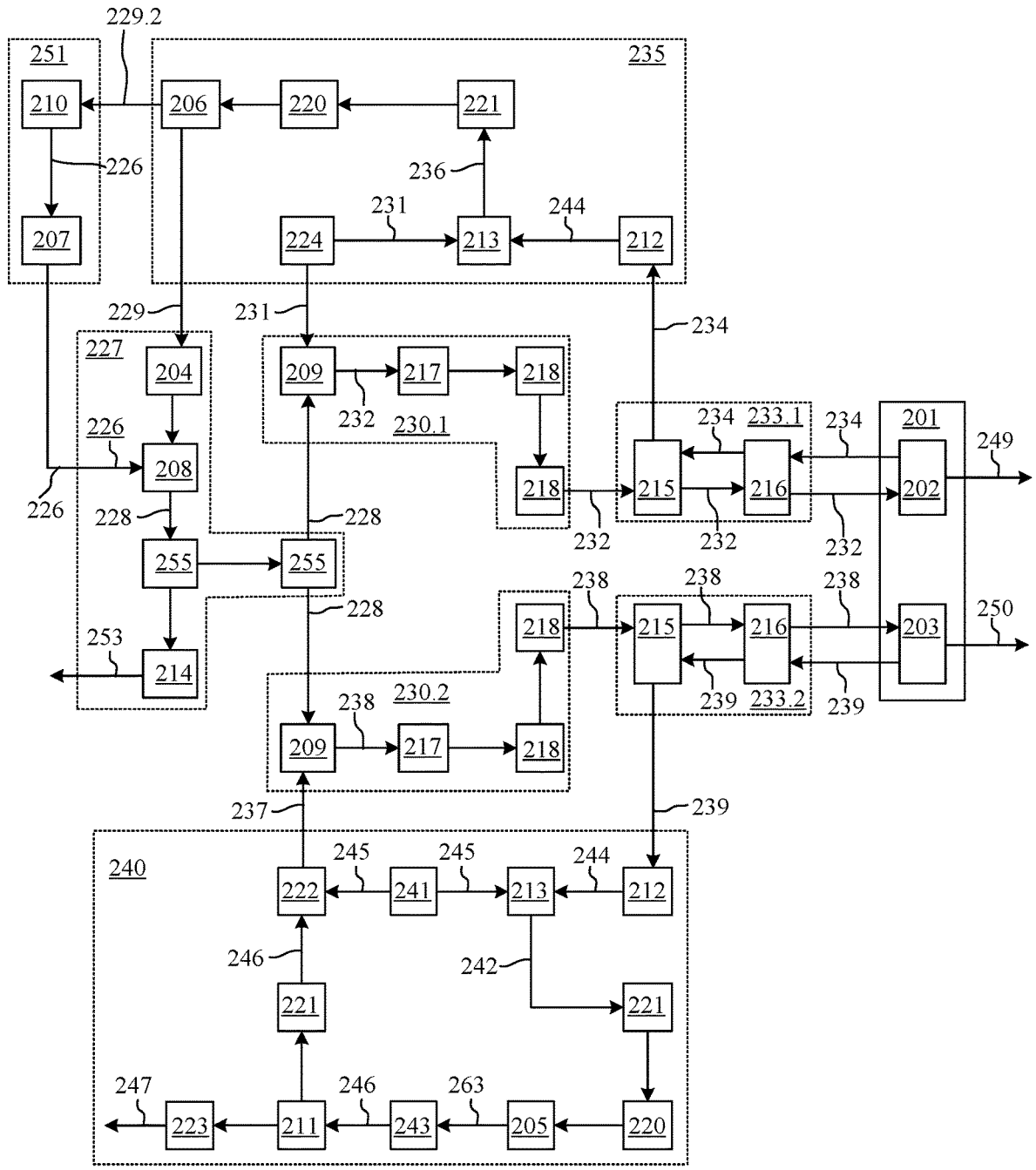
FIG. 2 shows an optical refraction barometer to produce dual sidebands.
Figure 3:
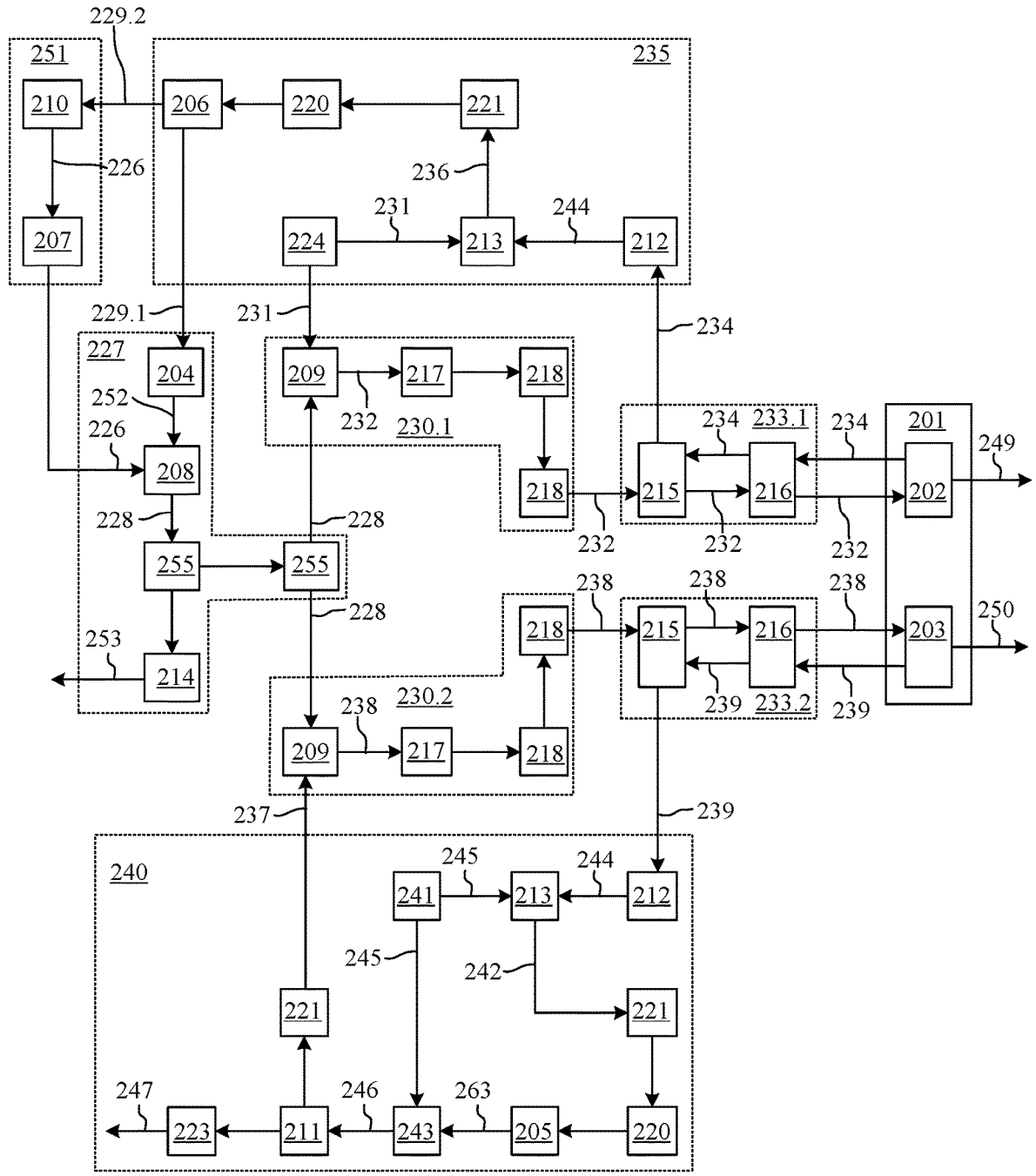
FIG. 3 shows an optical refraction barometer to produce electronic sidebands.
Figure 4:
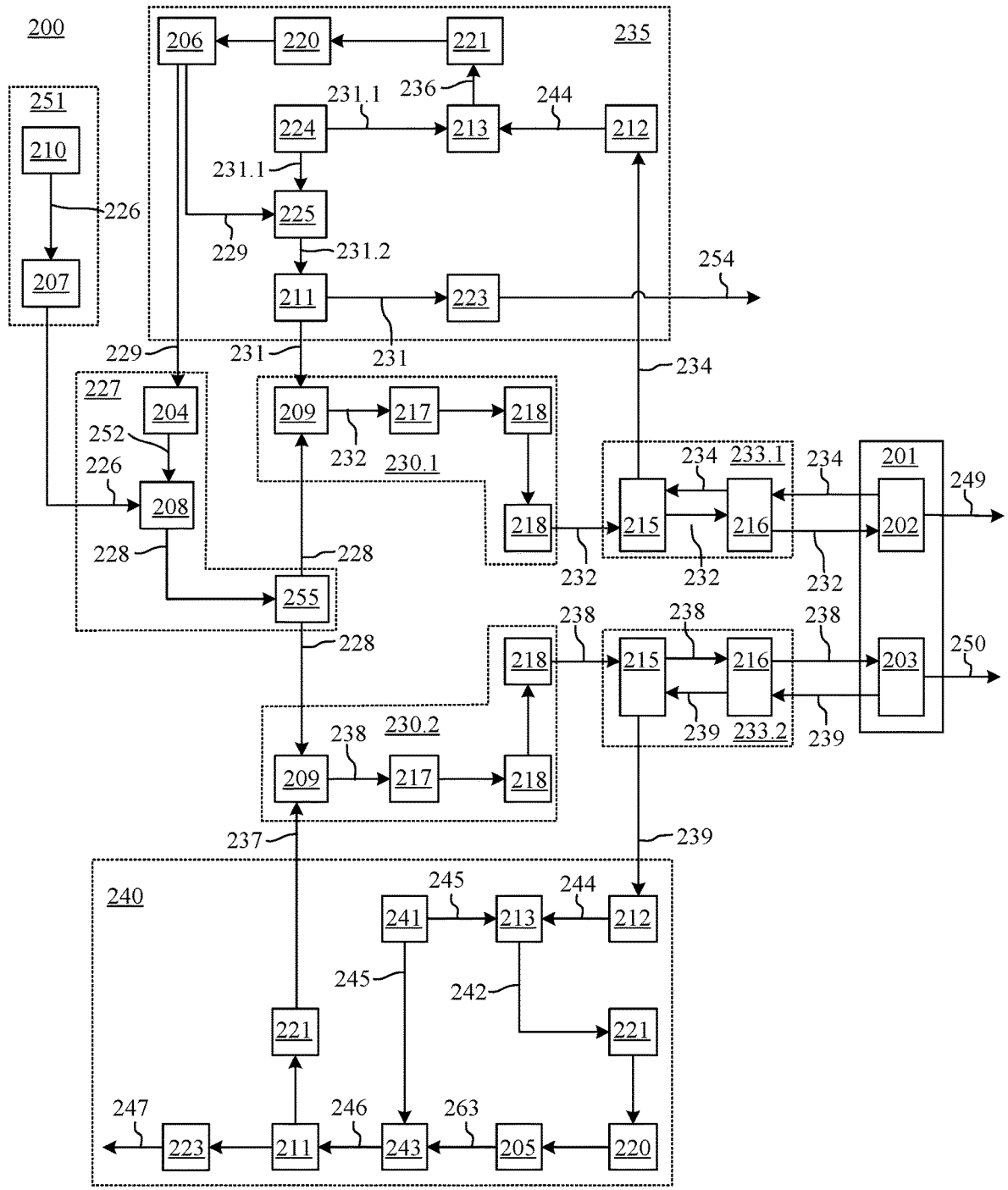
FIG. 4 shows an optical refraction barometer.
Figure 5:
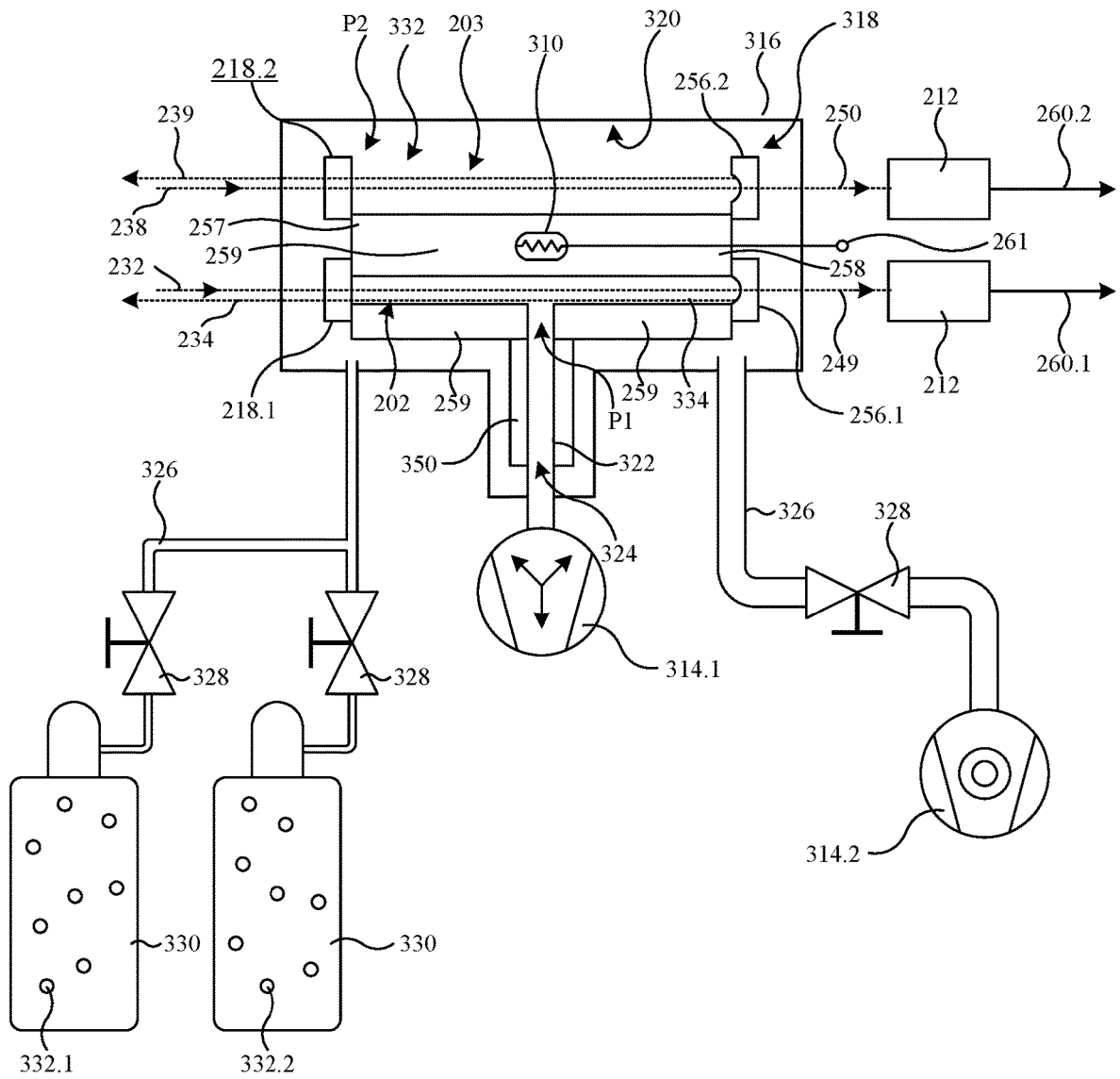
FIG. 5 shows a dual fixed length optical cavity refractometer.
Figure 6:
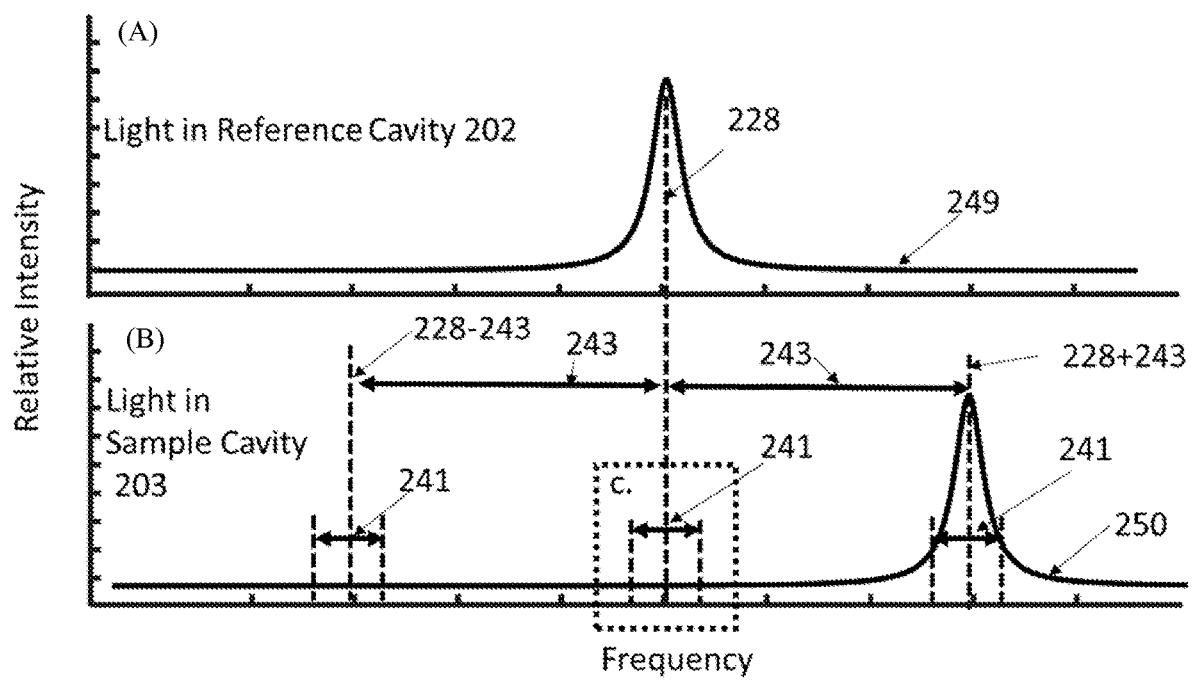
FIG. 6 shows: in panel A, a graph of relative intensity versus frequency for laser light transmission through reference cavity 202 with laser light 228 locked to a peak of the transmission; and in panel B, transmission of light though the sample cavity, wherein offset tuning frequency 243 is applied to EOM 209 to tune a sideband into resonance with the sample cavity. Some dashed lines show sidebands output from EOM 209. Frequency 241 creates an error signal for locking the laser to the offset sideband. Panel C shows a dashed lines around laser light 228 that indicate sidebands from frequency 241 applied to EOM 209 for dual sideband production. For the electronic sideband production, these sidebands are absent.

It should be appreciated that alternative configurations of hardware for is contemplated as shown in FIG. 2 and FIG. 3. With reference to FIG. 2, optical refraction barometer 200 uses electronic sample arm 240 to produce dual sidebands. As shown FIG. 2 and in the upper panel of FIG. 6, dual sideband production is accomplished by combining the radio frequency modulation with an offset tuning frequency amplify this signal and applying to the EOM. The resulting laser frequency has modulation sidebands around the laser carrier frequency and has sidebands at the offset modulation frequency which also have sidebands from the radio frequency modulation. This configuration provides locking the laser to the offset frequency for servo control to the offset frequency. With reference to FIG. 3, optical refraction barometer 200 uses electronic sample arm 240 to produce electronic sidebands. As shown FIG. 3 and in the bottom panel of FIG. 6, electronic sideband production is accomplished by frequency modulation of the offset frequency. As a result, the laser carrier frequency has sidebands at the offset tuning frequency and those sidebands have the radio frequency sidebands on them, which are used for servo control. Advantageously, there are no radio frequency modulation sidebands around the carrier and less light is wasted, which is more efficient for the modulator.

Optical refraction barometer 200 can be made in various ways. In an embodiment, a process for making optical refraction barometer 200 includes arranged optical components to be in optical communication so that light propagates either through optical fiber or free space and arranging electrical components to communicate electrical signals amongst the various electrical components.

The process for making optical refraction barometer 200 also can include locking the laser using AOM and internal slow laser controller that can be piezo or thermal. With the laser locked, the offset sideband can be tuned into resonance and locked onto a nearest cavity resonance. The sign of the sideband (carrier plus or carrier minus) will be used for calculation of pressure of sample gas in the sample cavity. This is performed initially at vacuum, $f_{Bi}$, and then at pressure, $f_{Bf}$. $f_{Rf}$ is the wavelength of the laser locked to the reference cavity, according to $$\left(\frac{\Delta f}{f}\right)_{eff} = FSR(1+\epsilon_\alpha)\frac{\frac{(f_{Bi}-f_{Bf})}{FSR}+\Delta m}{f_{Bf}+f_{Rf}} \tag{1}$$

such that, from these measurements, the known virial refractivity and density coefficients and known prior determination of the distortion constants. The absolute pressure of a gas can be determined using the following equation $$p = \frac{1}{c_1-d_m-d_r}\left(\frac{\Delta f}{f}\right)_{eff} - \frac{(c_2-c_1d_m)}{(c_1-d_m-d_r)}\left(\frac{\Delta f}{f}\right)_{eff}^2 + \tag{2}$$

$$\frac{2(c_2-c_1d_m)^2-c_3(c_1-d_m-d_r)}{(c_1-d_m-d_r)^5}\left(\frac{\Delta f}{f}\right)_{eff}^3$$

$$\text{wherein } c_1 = \frac{3A_R}{2kT}$$

$$c_2 = \frac{3(A_R^2-4A_RB_p+4B_R)}{8(kT)^2}$$

$$c_3 = \frac{3[5A_R^3-4A_R^2B_p+16A_RB_p^2+4A_RB_R-16B_pB_R-8A_RC_p+8C_R]}{16(kT)^3}$$

with $d_m$ being a bulk distortion term; $d_r$ being a mirror bending distortion term; Ar, Br, Cr being virial refractivity coefficients; and Bp Cp being density virial coefficients with Boltzmann constant k and temperature T.

With respect to a process for measuring, pressure based on refractivity changes with dual fixed length optical cavities of acousto-optica modulator 208 with optical refraction barometer 200, index of refraction involves a photon with a fixed wavelength that has a different frequency in the presence of gas than in a vacuum. Laser light can propagate in the two cavities, one filled with gas and the other evacuated to measure the frequency change. A laser is wavelength-locked in resonance to a Fabry-Perot cavity (reference cavity), if gas density (i.e., pressure) changes in the sample cavity, the servo adjusts the frequency f to maintain resonance with the cavity. Changes in f then give the index of refraction according to:

$$n-1 \approx \frac{-\Delta f + \Delta m(c_0/2L)}{f}$$

where $\Delta f = f - f_0$ ($f_0$ is the laser frequency in vacuum, and f is the frequency in the gas medium, $\Delta m$ is the change in mode order, and L is the length of the cavity. It is contemplated that the laser frequency can be determined by measuring the difference in frequency between the measurement laser and a reference laser locked to the vacuum channel. Alternatively, the difference frequency can be measured directly on the frequency counter that measures the output frequency of the offset tuning sideband.

Optical refraction barometer 200 has numerous advantageous and unexpected benefits and uses. In an embodiment, a process for measuring pressure based on refractivity changes between fixed length optical reference cavity 202 and fixed length optical sample cavity 203 of dual fixed length optical cavity refractometer 201 includes: producing laser light 226 by optical light source 251; receiving, by optical frequency controller 227, laser light 226 from optical light source 251; receiving, by optical frequency controller 227, optical feedback signal 229 from electronic reference arm 235; producing, by optical frequency controller 227, primary light 228 from laser light 226 based on optical feedback signal 229; receiving, by first optical phase controller 230.1, primary light 228 from optical frequency controller 227; receiving, by first optical phase controller 230.1, reference phase control signal 231; producing, by first optical phase controller 230.1, input reference light 232 from primary light 228 based on reference phase control signal 231; receiving, by first polarization controller 233.1, input reference light 232 from first optical phase controller 230.1; communicating, by first polarization controller 233.1, input reference light 232 to dual fixed length optical cavity refractometer 201; receiving, by first polarization controller 233.1, output reference light 234 from dual fixed length optical cavity refractometer 201; communicating, by first polarization controller 233.1, output reference light 234 to electronic reference arm 235; receiving, by electronic reference arm 235, output reference light 234 from first polarization controller 233.1; producing, by electronic reference arm 235, reference phase control signal 231 from output reference light 234; communicating, by electronic reference arm 235, reference phase control signal 231 to first optical phase controller 230.1; producing, by electronic reference arm 235, optical feedback signal 229; communicating, by electronic reference arm 235, optical feedback signal 229 to optical frequency controller 227; optionally communicating optical feedback signal 229 to optical light source 251 from electronic reference arm 235; receiving, by second optical phase controller 230.2, primary light 228 from optical frequency controller 227; receiving, by second optical phase controller 230.2, sample phase control signal 237 from electronic sample arm 240; producing, by second optical phase controller 230.2, input sample light 238 from primary light 228 based on sample phase control signal 237; receiving, by second polarization controller 233.2, input sample light 238 from second optical phase controller 230.2; communicating, by second polarization controller 233.2, input sample light 238 to dual fixed length optical cavity refractometer 201; receiving, by second polarization controller 233.2, an output reference light 239 from dual fixed length optical cavity refractometer 201; communicating, by second polarization controller 233.2, output reference light 239 to electronic sample arm 240; receiving, by detector 212 of electronic sample arm 240, output reference light 239 from second polarization controller 233.2 and producing reference cavity signal 244 from output reference light 239; producing, by second sideband frequency generator 241 of electronic sample arm 240, second sideband frequency 245; producing, by mixer 213 of electronic sample arm 240, error signal 242; receiving, by first sideband frequency generator 243 of electronic sample arm 240, error signal 242 and producing first sideband frequency 246 from error signal 242; producing, by electronic sample arm 240, sample phase control signal 237 from first sideband frequency 246; communicating sample phase control signal 237 to second optical phase controller 230.2 from electronic sample arm 240; receiving, by fixed length optical reference cavity 202, input reference light 232 from first polarization controller 233.1; propagating input reference light 232 through fixed length optical reference cavity 202; producing, by fixed length optical reference cavity 202, output reference light 234 by reflecting input reference light 232 from mirror disposed at terminus of fixed length optical reference cavity 202; receiving, by fixed length optical sample cavity 203, input sample light 238 from second polarization controller 233.2; propagating input sample light 238 through fixed length optical sample cavity 203; and producing, by fixed length optical sample cavity 203, output reference light 239 by reflecting input sample light 238 from second mirror disposed at terminus of fixed length optical sample cavity 203.

In an embodiment, the process for measuring pressure based on refractivity changes between fixed length optical reference cavity 202 and fixed length optical sample cavity 203 of dual fixed length optical cavity refractometer 201 thither includes, wherein optical frequency controller 227 includes voltage controlled oscillator 204 in electrical communication with electronic reference arm 235: receiving, by voltage controlled oscillator 204, optical feedback signal 229 from electronic reference arm 235; and producing, by voltage controlled oscillator 204, a reference modulation frequency 252 from optical feedback signal 229; and wherein optical frequency controller 227 further includes acousto-optic modulator 208 in electrical communication with voltage controlled oscillator 204 and in optical communication with optical light source 251, the process further includes: receiving, by acousto-optic modulator 208, reference modulation frequency 252 from voltage controlled oscillator 204 and laser light 226 from optical light source 251; and producing, by acousto-optic modulator 208, primary light 228 from modulation of laser light 226 at a modulation frequency controlled by reference modulation frequency 252.

In an embodiment, the process for measuring pressure based on refractivity changes between fixed length optical reference cavity 202 and fixed length optical sample cavity 203 of dual fixed length optical cavity refractometer 201 further includes, wherein first optical phase controller 230.1 includes electro-optic modulator 209 in optical communication with optical frequency controller 227 and in electrical communication with electronic reference arm 235: receiving, by electro-optic modulator 209, primary light 228 from optical frequency controller 227; receiving, by electro-optic modulator 209, reference phase control signal 231 from electronic reference arm 235; and producing, by electro-optic modulator 209, input reference light 232 from modulating primary light 228 at a modulation frequency controlled by reference phase control signal 231.

In an embodiment, the process for measuring pressure based on refractivity changes between fixed length optical reference cavity 202 and fixed length optical sample cavity 203 of dual fixed length optical cavity refractometer 201 further includes, wherein second optical phase controller 230.2 includes electro-optic modulator 209 in optical communication with optical frequency controller 227 and in electrical communication with electronic sample arm 240: receiving, by electro-optic modulator 209, primary light 228 from optical frequency controller 227; receiving, by electro-optic modulator 209, sample phase control signal 237 from electronic sample arm 240; and producing, by electro-optic modulator 209, input sample light 238 from modulating primary light 228 at a modulation frequency controlled by sample phase control signal 237.

In an embodiment, the process for measuring pressure based on refractivity changes between fixed length optical reference cavity 202 and fixed length optical sample cavity 203 of dual fixed length optical cavity refractometer 201 further includes, wherein first polarization controller 233.1 includes polarizing beam splitter 215 in optical communication with first optical phase controller 230.1 and in electrical communication with electronic reference arm 235: receiving, by first polarization controller 233.1, input reference light 232 from first optical phase controller 230.1; communicating, by first polarization controller 233.1, input reference light 232 to a waveplate 216; receiving, by first polarization controller 233.1, output reference light 234 from waveplate 216; and communicating, by first polarization controller 233.1, output reference light 234 to electronic reference arm 235; and wherein first polarization controller 233.1 further includes waveplate 216 in optical communication with polarizing beam splitter 215 and dual fixed length optical cavity refractometer 201, the process further includes: receiving, by waveplate 216, input reference light 232 from polarizing beam splitter 215; receiving, by waveplate 216, output reference light 234 from fixed length optical reference cavity 202; and communicating, by waveplate 216, output reference light 234 to polarizing beam splitter 215; and wherein second polarization controller 233.2 includes second polarizing beam splitter 215 in optical communication with second optical phase controller 230.2 and in electrical communication with electronic sample arm 240, the process further includes: receiving, by second polarizing beam splitter 215, input sample light 238 from second optical phase controller 230.2; communicating input sample light 238 to second waveplate 216 from second polarizing beam splitter 215; receiving, by second polarizing beam splitter 215, output reference light 239 from second waveplate 216; and communicating output reference light 239 to electronic sample arm 240 from second polarizing beam splitter 215; and wherein second polarization controller 233.2 further includes second waveplate 216 in optical communication with second polarizing beam splitter 215 and fixed length optical sample cavity 203, the process further includes: receiving, by second waveplate 216, input sample light 238 from second polarizing beam splitter 215; receiving, by second waveplate 216, output reference light 239 from fixed length optical sample cavity 203; and communicating output reference light 239 to polarizing beam splitter 215 from second waveplate 216.

In an embodiment, the process for measuring pressure based on refractivity changes between fixed length optical reference cavity 202 and fixed length optical sample cavity 203 of dual fixed length optical cavity refractometer 201 further includes, wherein electronic sample arm 240 includes detector 212 in optical communication with second polarization controller 233.2: receiving, by detector 212, output reference light 239 from second polarization controller 233.2; and producing, by detector 212, a reference cavity signal 244 from output reference light 239; and wherein electronic sample arm 240 further includes second sideband frequency generator 241, the process further includes producing, by second sideband frequency generator 241, a second sideband frequency 245; wherein electronic sample arm 240 further includes mixer 213 in electrical communication with detector 212 and second sideband frequency generator 241, the process further includes: receiving, by mixer 213, reference cavity signal 244 from detector 212; receiving, by mixer 213, second sideband frequency 245 from second sideband frequency generator 241; and producing, by mixer 213, error signal 242 that includes reference cavity signal 244 and second sideband frequency 245; wherein electronic sample arm 240 further includes PID servo 205 in electrical communication with mixer 213, the process further includes: receiving, by PID servo 205, error signal 242; and producing, by PID servo 205, a servo control signal 263 from error signal 242; wherein electronic sample arm 240 further includes first sideband frequency generator 243 in electrical communication with PID servo 205, the process further includes: receiving, by first sideband frequency generator 243, servo control signal 263; and producing, by first sideband frequency generator 243, first sideband frequency 246 from servo control signal 263; and wherein electronic sample aim 240 further includes power combiner 222 in electrical communication with first sideband frequency generator 243 and second sideband frequency generator 241, the process further includes: receiving, by power combiner 222, first sideband frequency 246 from first sideband frequency generator 243 and second sideband frequency 245 from second sideband frequency generator 241; producing, by power combiner 222, sample phase control signal 237 from first sideband frequency 246 and second sideband frequency 245; and communicating sample phase control signal 237 to second optical phase controller 230.2 from power combiner 222.

In an embodiment, the process for measuring pressure based on refractivity changes between fixed length optical reference cavity 202 and fixed length optical sample cavity 203 of dual fixed length optical cavity refractometer 201 further includes, wherein electronic sample arm 240 includes detector 212 in optical communication with second polarization controller 233.2: receiving, by detector 212, output reference light 239 from second polarization controller 233.2; and producing, by detector 212, reference cavity signal 244 from output reference light 239; producing, by second sideband frequency generator 241, second sideband frequency 245; wherein electronic sample arm 240 further includes mixer 213 in electrical communication with detector 212 and second sideband frequency generator 241, the process further includes: receiving, by mixer 213, reference cavity signal 244 from detector 212; receiving, by mixer 213, second sideband frequency 245 from second sideband frequency generator 241; and producing, by mixer 213, error signal 242 that includes reference cavity signal 244 and second sideband frequency 245; wherein electronic sample arm 240 further includes PID servo 205 in electrical communication with mixer 213, the process further includes: receiving, by PID servo 205, error signal 242; and producing, by PID servo 205, servo control signal 263 from error signal 242; wherein electronic sample arm 240 further includes first sideband frequency generator 243 in electrical communication with PID servo 205 and second sideband frequency generator 241, the process further includes: receiving, by first sideband frequency generator 243, servo control signal 263 from PID servo 205; receiving, by first sideband frequency generator 243, second sideband frequency 245 from second sideband frequency generator 241; and producing, by first sideband frequency generator 243, first sideband frequency 246 from servo control signal 263 and second sideband frequency 245; and wherein electronic sample arm 240 further includes directional coupler 211 in electrical communication with first sideband frequency generator 243, the process further includes: receiving, by directional coupler 211, first sideband frequency 246 from first sideband frequency generator 243; producing, by directional coupler 211, sample phase control signal 237 from first sideband frequency 246; and communicating sample phase control signal 237 to second optical phase controller 230.2 from directional coupler 211.

In an embodiment, the process for measuring pressure based on refractivity changes between fixed length optical reference cavity 202 and fixed length optical sample cavity 203 of dual fixed length optical cavity refractometer 201 further includes, wherein electronic reference arm 235 includes detector 212 in optical communication with first polarization controller 233.1: receiving, by detector 212, output reference light 234 from first polarization controller 233.1; and producing, by detector 212, reference cavity signal 244 from output reference light 234; wherein electronic reference arm 235 further includes radio frequency source 224, the process further includes producing reference phase control signal 231 by radio frequency source 224; wherein electronic reference arm 235 includes mixer 213 in electrical communication with detector 212 and radio frequency source 224, the process further includes: receiving, by mixer 213, reference cavity signal 244 from detector 212; receiving, by mixer 213, reference phase control signal 231 from radio frequency source 224; and producing, by mixer 213, mixed reference signal 236 that includes reference cavity signal 244 and reference phase control signal 231; and wherein electronic reference arm 235 includes PIID servo 206 in electrical communication with mixer 213, the process further includes: receiving, by PIID servo 206, mixed reference signal 236; producing, by PIID servo 206, optical feedback signal 229 from mixed reference signal 236; and communicating, by PIID servo 206, optical feedback signal 229 to optical frequency controller 227 and optionally to optical light source 251.

It should be appreciated that, with reference to FIG. 2, the process for measuring pressure with dual sideband production and based on refractivity changes between fixed length optical reference cavity 202 and fixed length optical sample cavity 203 of dual fixed length optical cavity refractometer 201 includes measuring pressure with a single laser source and does not require the measurement of the optical beat frequency of two lasers sources. The exact frequency difference between both arms is tuned with a source, and a position of this source is measured with a frequency counter directly. The dual sideband or sideband on sideband involves combining both modulation and tuning frequencies.

With reference to FIG. 3, the process for measuring pressure with electronic sideband production and based on refractivity changes between fixed length optical reference cavity 202 and fixed length optical sample cavity 203 of dual fixed length optical cavity refractometer 201 includes locking the laser to a reference cavity and splitting the laser light and frequency modulating a tuning sideband frequency that can be independently locked to the sample cavity to provide more efficient use of laser light with no light wasted in sidebands around the carrier frequency.

With reference to FIG. 4, the process for measuring pressure based on refractivity changes between fixed length optical reference cavity 202 and fixed length optical sample cavity 203 of dual fixed length optical cavity refractometer 201 includes splitting light from a stabilized laser source into two arms (reference and sample) of the cavity that are locked independently. Here, both arms can use the dual side band or electronic sideband process for offset tuning from the stabilized laser and locking to the respective cavity. The process operates in an absence of an external determination of the wavelength of the laser locked to the reference cavity. That is, the wavelength is known exactly, and the offset frequency from the known frequency of the laser source is measured directly for each arm with the directional coupler and frequency counter. The pressure is determined by measuring the difference in resonant frequency between the two cavities at vacuum and at pressure and is realized by the sign of the offset (+/−from the carrier) and summing the frequencies from the two counters.

Optical refraction barometer 200 and processes disclosed herein have numerous beneficial uses, including absence of more than one laser source, fast photodetector to determine a beat note from transmission of light through sample and reference cavities, and external determination of the wavelength. Advantageously, optical refraction barometer 200 overcomes limitations or technical deficiencies of conventional devices such as noise and electro-optic complexity from heterodyning two independent laser systems to measure the difference frequency. In an aspect, optical refraction barometer 200 has sensitivity and resolution of 4 mPa for gases such as $N_2$.

Optical refraction barometer 200 and processes herein unexpectedly determine pressure of a sample gas in the sample cavity referenced to the reference cavity via optical methods and sideband production in an absence of a fast photodetector, fiber splitters, and combiners for measuring a difference frequency. In optical refraction barometer 200, the frequency difference is measured exactly from an extremely low noise high stability frequency source. The stability of the tight reference lock is transferred to the sample cavity and thus makes the laser locking to the sample cavity more robust and easier to implement. Drifts in the laser itself would appear in both arms and have greater common mode noise reduction providing long term stability and accurate pressure measurement. Optical refraction barometer is less costly than other devices that have multiple lasers and a fast photodetector. Moreover, optical refraction barometer 200 provides a method to realize pressure that can be made as a primary standard with much improved robustness and streamlined setup.

The articles and processes herein are illustrated further by the following Example, which is non-limiting.

EXAMPLE

Measurements were performed in an optical refraction barometer configured according to FIG. 3. The system included vacuum pressure in the reference cavity for the measurement. The measurement had a noise floor for the pressure measurement. A narrow linewidth fiber laser was modulated with an EOM and PDH-locked to the reference cavity using fast feedback to an AOM and slow feedback to the laser piezo transducer. A portion of the locked laser light was split and sent into a second EOM. This EOM was driven by a microwave synthesizer that was frequency modulated at 10 MHz. The PDH error signal was digitized and PID servo in software was used to control the frequency of the microwave synthesizer to maintain lock on the sample cavity.

Figure 7:
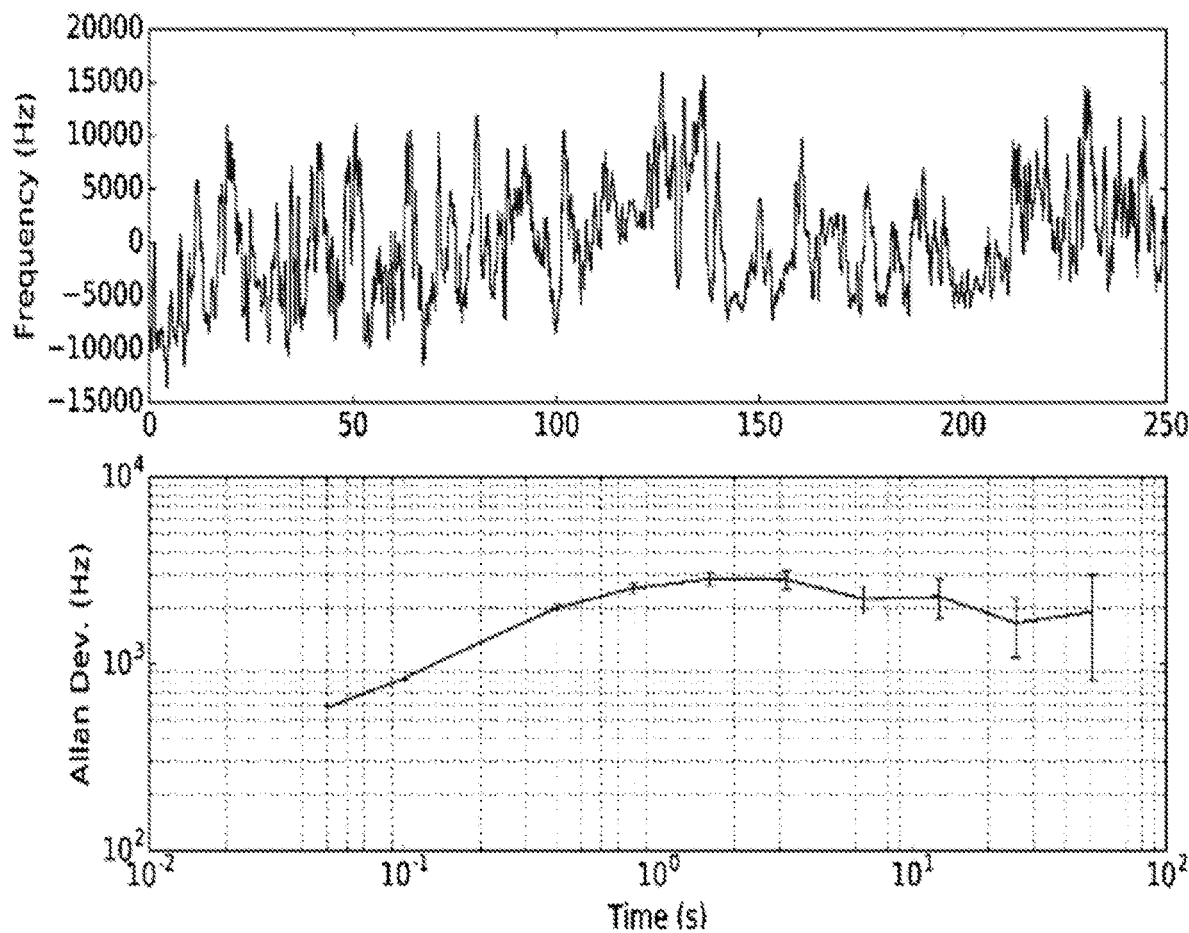
FIG. 7 shows a graph of frequency versus time and a graph of Allan deviation versus time.

Results are shown in FIG. 7. In the upper panel of FIG. 7, the frequency stability of the lock signal on the sample cavity is shown. The lower panel of FIG. 7 shows the Allan deviation. The Allan deviation was about 2 kHz over the measurement period of 4 minutes sets a minimum detectable pressure and pressure resolution for this particular configuration. For the 15 cm long sample cavity, the frequency shift at 1542 nm was about 510 kHz/Pa for $N_2$. An Allan deviation of 2 kHz corresponded to 4 mPa $N_2$ as measured by the single near IR laser with offset-locking.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. An optical refraction barometer for measuring pressure based on refractivity changes between a fixed length optical reference cavity and a fixed length optical sample cavity of a dual fixed length optical cavity refractometer, the optical refraction barometer comprising:
    an optical light source that produces laser light;
    an optical frequency controller in optical communication with the optical light source and that:
        receives the laser light from the optical light source;
        receives an optical feedback signal from an electronic reference arm; and
        produces primary light from the laser light based on the optical feedback signal;
    a first optical phase controller in optical communication with the optical frequency controller and that:
        receives the primary light from the optical frequency controller;
        receives a reference phase control signal; and
        produces an input reference light from the primary light based on the reference phase control signal;
    a first polarization controller in optical communication with the first optical phase controller and that:
        receives the input reference light from the first optical phase controller;
        communicates the input reference light to a dual fixed length optical cavity refractometer;
        receives an output reference light from the dual fixed length optical cavity refractometer; and
        communicates the output reference light to an electronic reference arm;
    the electronic reference arm in optical communication with the first polarization controller and that:
        receives the output reference light from the first polarization controller;
        produces the reference phase control signal from the output reference light and communicates the reference phase control signal to the first optical phase controller;
        produces the optical feedback signal and communicates the optical feedback signal to the optical frequency controller and optionally communicates the optical feedback signal to the optical light source;
    a second optical phase controller in optical communication with the optical frequency controller and that:
        receives the primary light from the optical frequency controller;
        receives a sample phase control signal from an electronic sample arm; and
        produces an input sample light from the primary light based on the sample phase control signal;
    a second polarization controller in optical communication with the second optical phase controller and that:
        receives the input sample light from the second optical phase controller;
        communicates the input sample light to the dual fixed length optical cavity refractometer;
        receives an output sample light from the dual fixed length optical cavity refractometer; and
        communicates the output sample light to the electronic sample arm;
    the electronic sample arm in optical communication with the second polarization controller and in electrical communication with the second optical phase controller, the electronic sample arm comprising:
        a detector that receives the output sample light from the second polarization controller and produces a reference cavity signal from the output sample light;
        a second sideband frequency generator that produces a second sideband frequency;
        a mixer in electrical communication with the detector and the second sideband frequency generator and that produces an error signal that comprises the reference cavity signal and the second sideband frequency; and
        a first sideband frequency generator in electrical communication with the mixer and that receives the error signal from the mixer and produces a first sideband frequency from the error signal from which the sample phase control signal is produced by the electronic sample arm for communication to the second optical phase controller; and
    the dual fixed length optical cavity refractometer comprising:
        the fixed length optical reference cavity in optical communication with the first polarization controller and that:
            receives the input reference light from the first polarization controller;
            propagates the input reference light through fixed length optical reference cavity; and
            produces the output reference light by reflecting input reference light from a mirror disposed at a terminus of the fixed length optical reference cavity disposed optically distal to the first polarization controller; and the fixed length optical sample cavity in optical communication with the second polarization controller and that:
receives the input sample light from the second polarization controller;
propagates the input sample light through the fixed length optical sample cavity; and
produces the output sample light by reflecting the input sample light from a second mirror disposed at a terminus of the fixed length optical sample cavity disposed optically distal to the second polarization controller.

2. The optical refraction barometer of claim 1, wherein the optical light source comprises a laser that produces the laser light; and a Faraday isolator in optical communication with the laser and that communicates the laser light to the optical frequency controller.

3. The optical refraction barometer of claim 1, wherein the optical frequency controller comprises a voltage controlled oscillator in electrical communication with the electronic reference arm and that receives the optical feedback signal from the electronic reference arm and that produces a reference modulation frequency from the optical feedback signal;
an acousto-optic modulator in electrical communication with the voltage controlled oscillator and in optical communication with the optical light source and that:
receives the reference modulation frequency from the voltage controlled oscillator and the laser light from the optical light source; and
produces the primary light from modulation of the laser light at a modulation frequency controlled by the reference modulation frequency.

4. The optical refraction barometer of claim 3, wherein the optical frequency controller further comprises a wavelength detector in optical communication with the acousto-optic modulator and that receives the primary light from the acousto-optic modulator and produces an optical frequency counter signal from the primary light.

5. The optical refraction barometer of claim 1, wherein the first optical phase controller comprises an electro-optic modulator in optical communication with the optical frequency controller and in electrical communication with the electronic reference arm and that:
receives the primary light from the optical frequency controller;
receives the reference phase control signal from the electronic reference arm; and
produces the input reference light from modulating the primary light at a modulation frequency controlled by the reference phase control signal.

6. The optical refraction barometer of claim 1, wherein the second optical phase controller comprises an electro-optic modulator in optical communication with the optical frequency controller and in electrical communication with the electronic sample arm and that:
receives the primary light from the optical frequency controller;
receives the sample phase control signal from the electronic sample arm; and
produces the input sample light from modulating the primary light at a modulation frequency controlled by the sample phase control signal.

7. The optical refraction barometer of claim 1, wherein the first polarization controller comprises:

a polarizing beam splitter in optical communication with the first optical phase controller and in electrical communication with the electronic reference arm and that:
receives the input reference light from the first optical phase controller;
communicates the input reference light to a waveplate;
receives the output reference light from the waveplate; and
communicates the output reference light to the electronic reference arm; and
the waveplate in optical communication with the polarizing beam splitter and the dual fixed length optical cavity refractometer and that:
receives the input reference light from the polarizing beam splitter;
receives the output reference light from the fixed length optical reference cavity; and
communicates the output reference light to the polarizing beam splitter.

8. The optical refraction barometer of claim 1, wherein the second polarization controller comprises:
a polarizing beam splitter in optical communication with the second optical phase controller and in electrical communication with the electronic sample arm and that:
receives the input sample light from the second optical phase controller;
communicates the input sample light to a waveplate;
receives the output sample light from the waveplate; and
communicates the output sample light to the electronic sample arm; and
the waveplate in optical communication with the polarizing beam splitter and the dual fixed length optical cavity refractometer and that:
receives the input sample light from the polarizing beam splitter;
receives the output sample light from the fixed length optical sample cavity; and
communicates the output sample light to the polarizing beam splitter.

9. The optical refraction barometer of claim 1, wherein the electronic reference arm comprises:
a detector in optical communication with the first polarization controller and that receives the output reference light from the first polarization controller; and produces a reference cavity signal from the output reference light;
a radio frequency source that produces a reference phase control signal;
a mixer in electrical communication with the detector and the radio frequency source and that:
receives the reference cavity signal from the detector;
receives the reference phase control signal from the radio frequency source; and
produces a mixed reference signal that comprises the reference cavity signal and the reference phase control signal; and
a PIID servo in electrical communication with the mixer and that receives the mixed reference signal and produces the optical feedback signal that is communicated to the optical frequency controller and optionally to the optical light source.

10. The optical refraction barometer of claim 1, wherein the electronic reference arm comprises:
a detector in optical communication with the first polarization controller and that receives the output reference light from the first polarization controller; and produces a reference cavity signal from the output reference light;
a radio frequency source that produces a first reference phase control signal;
a mixer in electrical communication with the detector and the radio frequency source and that:
receives the reference cavity signal from the detector;
receives the first reference phase control signal from the radio frequency source; and
produces a mixed reference signal that comprises the reference cavity signal and the first reference phase control signal;
a PIID servo in electrical communication with the mixer and that receives the mixed reference signal and produces the optical feedback signal that is communicated to the optical frequency controller and optionally to the optical light source;
a sideband frequency source in electrical communication with the radio frequency source and the PIID servo and that:
receives the first reference phase control signal from the radio frequency source;
receives the optical feedback signal from the PIID servo; and
produces a second reference phase control signal from the optical feedback signal and the first reference phase control signal;
a directional coupler in electrical communication with the sideband frequency source and that:
receives the second reference phase control signal from the sideband frequency source;
produces the reference phase control signal from the second reference phase control signal; and
communicate the reference phase control signal to the first optical phase controller.

11. A process for measuring pressure based on refractivity changes between the fixed length optical reference cavity and the fixed length optical sample cavity of the dual fixed length optical cavity refractometer of the optical refraction barometer of claim 1, the process comprising:
producing laser light by the optical light source;
receiving, by the optical frequency controller, the laser light from the optical light source;
receiving, by the optical frequency controller, the optical feedback signal from the electronic reference arm;
producing, by the optical frequency controller, the primary light from the laser light based on the optical feedback signal;
receiving, by the first optical phase controller, the primary light from the optical frequency controller;
receiving, by the first optical phase controller, the reference phase control signal;
producing, by the first optical phase controller, the input reference light from the primary light based on the reference phase control signal;
receiving, by the first polarization controller, the input reference light from the first optical phase controller;
communicating, by the first polarization controller, the input reference light to the dual fixed length optical cavity refractometer;
receiving, by the first polarization controller, the output reference light from the dual fixed length optical cavity refractometer;
communicating, by the first polarization controller, the output reference light to the electronic reference arm;
receiving, by the electronic reference arm, the output reference light from the first polarization controller;
producing, by the electronic reference arm, the reference phase control signal from the output reference light;
communicating, by the electronic reference arm, the reference phase control signal to the first optical phase controller;
producing, by the electronic reference arm, the optical feedback signal;
communicating, by the electronic reference arm, the optical feedback signal to the optical frequency controller;
optionally communicating the optical feedback signal to the optical light source from the electronic reference arm;
receiving, by the second optical phase controller, the primary light from the optical frequency controller;
receiving, by the second optical phase controller, the sample phase control signal from the electronic sample arm;
producing, by the second optical phase controller, the input sample light from the primary light based on the sample phase control signal;
receiving, by the second polarization controller, the input sample light from the second optical phase controller;
communicating, by the second polarization controller, the input sample light to the dual fixed length optical cavity refractometer;
receiving, by the second polarization controller, an output sample light from the dual fixed length optical cavity refractometer;
communicating, by the second polarization controller, the output sample light to the electronic sample arm;
receiving, by the detector of the electronic sample arm, the output sample light from the second polarization controller and producing the reference cavity signal from the output sample light;
producing, by the second sideband frequency generator of the electronic sample arm, the second sideband frequency;
producing, by the mixer of the electronic sample arm, the error signal;
receiving, by the first sideband frequency generator of the electronic sample arm, the error signal and producing the first sideband frequency from the error signal;
producing, by the electronic sample arm, the sample phase control signal from the first sideband frequency;
communicating the sample phase control signal to the second optical phase controller from the electronic sample arm;
receiving, by the fixed length optical reference cavity, the input reference light from the first polarization controller;
propagating the input reference light through fixed length optical reference cavity;
producing, by the fixed length optical reference cavity, the output reference light by reflecting the input reference light from the mirror disposed at the terminus of the fixed length optical reference cavity;
receiving, by the fixed length optical sample cavity, the input sample light from the second polarization controller;
propagating the input sample light through the fixed length optical sample cavity; and
producing, by the fixed length optical sample cavity, the output sample light by reflecting the input sample light from the second mirror disposed at the terminus of the fixed length optical sample cavity.

12. The process of claim 11, wherein the optical frequency controller comprises a voltage controlled oscillator in electrical communication with the electronic reference arm, and process further comprises:
receiving, by the voltage controlled oscillator, the optical feedback signal from the electronic reference arm; and
producing, by the voltage controlled oscillator, a reference modulation frequency from the optical feedback signal; and
wherein the optical frequency controller further comprises an acousto-optic modulator in electrical communication with the voltage controlled oscillator and in optical communication with the optical light source, and the process further comprises:
receiving, by the acousto-optic modulator, the reference modulation frequency from the voltage controlled oscillator and the laser light from the optical light source; and
producing, by the acousto-optic modulator, the primary light from modulation of the laser light at a modulation frequency controlled by the reference modulation frequency.

13. The process of claim 11, wherein the first optical phase controller comprises an electro-optic modulator in optical communication with the optical frequency controller and in electrical communication with the electronic reference arm, and the process further comprises:
receiving, by the electro-optic modulator, the primary light from the optical frequency controller;
receiving, by the electro-optic modulator, the reference phase control signal from the electronic reference arm; and
producing, by the electro-optic modulator, the input reference light from modulating the primary light at a modulation frequency controlled by the reference phase control signal.

14. The process of claim 11, wherein the second optical phase controller comprises an electro-optic modulator in optical communication with the optical frequency controller and in electrical communication with the electronic sample arm, and the process further comprises:
receiving, by the electro-optic modulator, the primary light from the optical frequency controller;
receiving, by the electro-optic modulator, the sample phase control signal from the electronic sample arm; and
producing, by the electro-optic modulator, the input sample light from modulating the primary light at a modulation frequency controlled by the sample phase control signal.

15. The process of claim 11, wherein the first polarization controller comprises a polarizing beam splitter in optical communication with the first optical phase controller and in electrical communication with the electronic reference arm, and the process further comprises:
receiving, by the first polarization controller, the input reference light from the first optical phase controller;
communicating, by the first polarization controller, the input reference light to a waveplate;
receiving, by the first polarization controller, the output reference light from the waveplate; and
communicating, by the first polarization controller, the output reference light to the electronic reference arm; and
wherein the first polarization controller further comprises the waveplate in optical communication with the polarizing beam splitter and the dual fixed length optical cavity refractometer, and the process further comprises:
receiving, by the waveplate, the input reference light from the polarizing beam splitter;
receiving, by the waveplate, the output reference light from the fixed length optical reference cavity; and
communicating, by the waveplate, the output reference light to the polarizing beam splitter; and
wherein the second polarization controller comprises a second polarizing beam splitter in optical communication with the second optical phase controller and in electrical communication with the electronic sample arm, and the process further comprises:
receiving, by the second polarizing beam splitter, the input sample light from the second optical phase controller;
communicating the input sample light to a second waveplate from the second polarizing beam splitter;
receiving, by the second polarizing beam splitter, the output sample light from the second waveplate; and
communicating the output sample light to the electronic sample arm from the second polarizing beam splitter; and
wherein the second polarization controller further comprises the second waveplate in optical communication with the second polarizing beam splitter and the fixed length optical sample cavity, and the process further comprising:
receiving, by the second waveplate, the input sample light from the second polarizing beam splitter;
receiving, by the second waveplate, the output sample light from the fixed length optical sample cavity; and
communicating the output sample light to the polarizing beam splitter from the second waveplate.

16. The process of claim 11, wherein the electronic sample arm comprises a detector in optical communication with the second polarization controller, and the process further comprises:
receiving, by the detector, the output sample light from the second polarization controller; and
producing, by the detector, a reference cavity signal from the output sample light; and
wherein the electronic sample arm further comprises a second sideband frequency generator, and the process further comprises producing, by the second sideband frequency generator, a second sideband frequency;
wherein the electronic sample arm further comprises a mixer in electrical communication with the detector and the second sideband frequency generator, and the process further comprising:
receiving, by the mixer, the reference cavity signal from the detector;
receiving, by the mixer, the second sideband frequency from the second sideband frequency generator; and
producing, by the mixer, an error signal that comprises the reference cavity signal and the second sideband frequency;
wherein the electronic sample arm further comprises a PID servo in electrical communication with the mixer, and the process further comprises:
receiving, by the PID servo, the error signal; and
producing, by the PID servo, a servo control signal from the error signal;
wherein the electronic sample arm further comprises a first sideband frequency generator in electrical communication with the PID servo, and the process further comprises:

receiving, by the first sideband frequency generator, the servo control signal; and producing, by the first sideband frequency generator, a first sideband frequency from the servo control signal; and wherein the electronic sample arm further comprises a power combiner in electrical communication with the first sideband frequency generator and the second sideband frequency generator, and the process further comprises:

receiving, by the power combiner, the first sideband frequency from the first sideband frequency generator and the second sideband frequency from the second sideband frequency generator;

producing, by the power combiner, the sample phase control signal from the first sideband frequency and the second sideband frequency; and communicating the sample phase control signal to the second optical phase controller from the power combiner.

17. The process of claim 11, wherein the electronic sample arm comprises a detector in optical communication with the second polarization controller, and the process further comprising:

receiving, by the detector, the output sample light from the second polarization controller; and producing, by the detector, a reference cavity signal from the output sample light;

producing, by a second sideband frequency generator, a second sideband frequency;

wherein the electronic sample arm further comprises a mixer in electrical communication with the detector and the second sideband frequency generator, and the process further comprises:

receiving, by the mixer, the reference cavity signal from the detector;

receiving, by the mixer, the second sideband frequency from the second sideband frequency generator; and producing, by the mixer, an error signal that comprises the reference cavity signal and the second sideband frequency;

wherein the electronic sample arm further comprises a PID servo in electrical communication with the mixer, and the process further comprises:

receiving, by the PID servo, the error signal; and producing, by the PID servo, a servo control signal from the error signal;

wherein the electronic sample arm further comprises a first sideband frequency generator in electrical communication with the PID servo and the second sideband frequency generator, and the process further comprises:

receiving, by the first sideband frequency generator, the servo control signal from the PID servo;

receiving, by the first sideband frequency generator, the second sideband frequency from the second sideband frequency generator; and producing, by the first sideband frequency generator, a first sideband frequency from the servo control signal and the second sideband frequency; and wherein the electronic sample arm further comprises a directional coupler in electrical communication with the first sideband frequency generator, and the process further comprises:

receiving, by the directional coupler, the first sideband frequency from the first sideband frequency generator;

producing, by the directional coupler, the sample phase control signal from the first sideband frequency; and communicating the sample phase control signal to the second optical phase controller from the directional coupler.

18. The process of claim 11, wherein the electronic reference arm comprises a detector in optical communication with the first polarization controller, and the process further comprises:

receiving, by the detector, the output reference light from the first polarization controller; and producing, by the detector, a reference cavity signal from the output reference light;

wherein the electronic reference arm further comprises a radio frequency source, and the process further comprises producing a reference phase control signal by the radio frequency source;

wherein the electronic reference arm comprises a mixer in electrical communication with the detector and the radio frequency source, and the process further comprises:

receiving, by the mixer, the reference cavity signal from the detector;

receiving, by the mixer, the reference phase control signal from the radio frequency source; and producing, by the mixer, a mixed reference signal that comprises the reference cavity signal and the reference phase control signal; and wherein the electronic reference arm comprises a PIID servo in electrical communication with the mixer, and the process further comprises:

receiving, by the PIID servo, the mixed reference signal;

producing, by the PIID servo, the optical feedback signal from the mixed reference signal; and communicating, by the PIID servo, the optical feedback signal to the optical frequency controller and optionally to the optical light source.

* * * * *